US012315465B2

(12) United States Patent
Kubota

(10) Patent No.: US 12,315,465 B2
(45) Date of Patent: May 27, 2025

(54) ELECTRO-OPTICAL DEVICE AND ELECTRONIC APPARATUS

(71) Applicant: SEIKO EPSON CORPORATION, Tokyo (JP)

(72) Inventor: Takehiko Kubota, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/442,098

(22) Filed: Feb. 15, 2024

(65) Prior Publication Data

US 2024/0282270 A1 Aug. 22, 2024

(30) Foreign Application Priority Data

Feb. 16, 2023 (JP) ................................ 2023-022274

(51) Int. Cl.
*G09G 3/3291* (2016.01)
*G09G 3/3233* (2016.01)
*G09G 3/3266* (2016.01)

(52) U.S. Cl.
CPC ......... *G09G 3/3291* (2013.01); *G09G 3/3233* (2013.01); *G09G 3/3266* (2013.01); *G09G 2360/144* (2013.01)

(58) Field of Classification Search
CPC ... G09G 3/3291; G09G 3/3233; G09G 3/3266
See application file for complete search history.

(56) References Cited

U.S. PATENT DOCUMENTS

| | | | | |
|---|---|---|---|---|
| 11,751,446 | B2 | 9/2023 | Kodama et al. | |
| 2013/0285561 | A1* | 10/2013 | Kitadani | H05B 47/10 315/160 |
| 2018/0261155 | A1 | 9/2018 | Ota | |
| 2018/0261161 | A1* | 9/2018 | Ota | H10K 50/81 |
| 2021/0225990 | A1 | 7/2021 | Kodama et al. | |
| 2023/0101721 | A1 | 3/2023 | Kodama | |
| 2024/0321209 | A1* | 9/2024 | Kubota | G09G 3/3233 |

FOREIGN PATENT DOCUMENTS

| | | |
|---|---|---|
| JP | 2018151506 | 9/2018 |
| JP | 2021179628 | 11/2021 |
| JP | 2023050791 | 4/2023 |
| JP | 2024117945 A * | 8/2024 |

* cited by examiner

*Primary Examiner* — Xuemei Zheng
(74) *Attorney, Agent, or Firm* — JCIPRNET

(57) ABSTRACT

An electro-optical device including at least one of an optical sensor and a temperature sensor, a pixel circuit and a control circuit is provided. The pixel circuit includes an OLED that emits light at brightness corresponding to a current flowing from an anode to a cathode, and a transistor that causes a current corresponding to a voltage between a gate node and a source node to flow through the OLED. The control circuit executes a reset operation or a non-reset operation in accordance with information that is a detection result of an optical sensor and information that is a detection result of a temperature sensor. The reset operation is an operation of supplying a predetermined potential to the anode via a data line. The non-reset operation is an operation of distributing an electric charge accumulated in the data line to the anode.

7 Claims, 18 Drawing Sheets

<Crst>

| | Amb<Lth | Amb≧Lth |
|---|---|---|
| Tmp<Tth | L | H |
| Tmp≧Tth | H | H |

Crst=L : RESET OPERATION
Crst=H : NON-RESET OPERATION

ELECTRO-OPTICAL DEVICE AND ELECTRONIC APPARATUS

The present application is based on, and claims priority from JP Application Serial Number 2023-022274, filed Feb. 16, 2023, the disclosure of which is hereby incorporated by reference herein in its entirety.

BACKGROUND

1. Technical Field

The present disclosure relates to an electro-optical device and an electronic apparatus.

2. Related Art

In recent years, various types of electro-optical devices (display devices) using light-emitting elements such as an organic light-emitting diode (hereinafter referred to as an OLED) element have been proposed. In the electro-optical device, a configuration in which, corresponding to an intersection between a scanning line and a data line, a pixel circuit including a light-emitting element and a drive transistor is provided corresponding to a pixel of an image to be displayed is general.

In such a configuration, when a data signal having a potential corresponding to a gradation level of the pixel is supplied to a gate node of the drive transistor, the drive transistor supplies a current corresponding to a voltage between the gate node and a source node to the light-emitting element. Thus, the light-emitting element emits light at brightness corresponding to the gradation level.

As the pixel circuit, a configuration that includes four transistors including a drive transistor is known (for example, refer to JP-A-2021-179628).

When the electro-optical device is miniaturized and applied to a portable device, low power consumption is strongly required in relation to a battery or the like. However, the above-described configuration has a problem in that power consumption is not sufficiently reduced.

SUMMARY

In order to solve the above problem, an electro-optical device according to an aspect of the present disclosure includes at least one of an optical sensor configured to detect brightness of ambient light and a temperature sensor configured to detect a temperature, a pixel circuit provided corresponding to a data line and a scanning line, and a control circuit configured to control the pixel circuit, in which the pixel circuit includes a light-emitting element configured emit light at brightness corresponding to a current flowing between two electrodes, and a drive transistor configured to supply, to the light-emitting element, a current corresponding to a voltage between a potential of a gate node and a potential of a source node, in a writing period, the control circuit supplies, to the gate node via the data line, a potential corresponding to a gradation level, and in a first initialization period before the writing period, the control circuit executes a first operation or a second operation in accordance with a detection result of the optical sensor or a detection result of the temperature sensor, the first operation being an operation of supplying, via the data line, a predetermined potential to one electrode of the light-emitting element, the second operation being an operation of distributing, to the one electrode, an electric charge accumulated in the data line.

DESCRIPTION OF EMBODIMENTS

An electro-optical device according to embodiments will be described below with reference to the accompanying drawings. Note that in each of the drawings, dimensions and scale of each part are made different from actual ones as appropriate. Further, embodiments described below are suitable specific examples, and various technically preferable limitations are applied, but the scope of the disclosure is not limited to these embodiments unless they are specifically described in the following description as limiting the disclosure.

Figure 1:
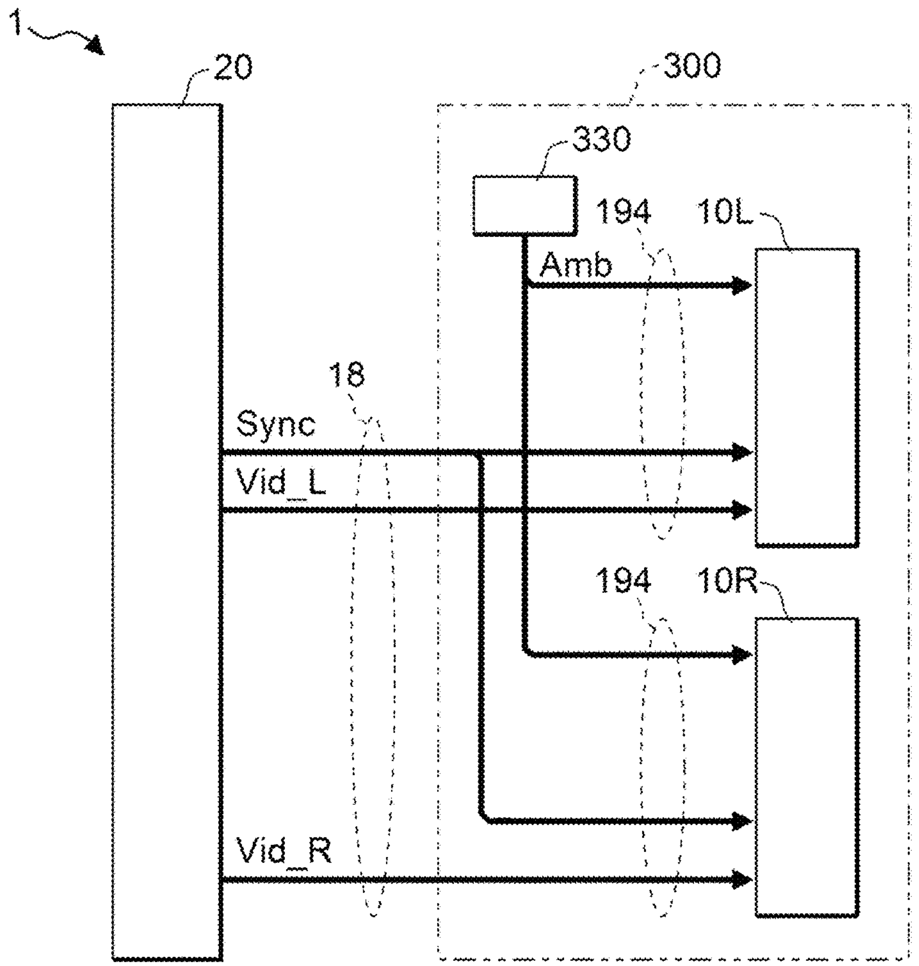
FIG. 1 is a block diagram illustrating an electrical configuration of a head mounted display system to which an electro-optical device according to a first embodiment is applied.

FIG. 1 is a block diagram illustrating a configuration of a head mounted display system 1 to which an electro-optical device according to a first embodiment is applied. The head mounted display system 1 is an example of the electronic apparatus to which the electro-optical device is applied.

As illustrated in the drawing, the head-mounted display system 1 includes a main controller 20 and a headset 300.

The main controller 20 outputs, via a cable 18, video data Vid_L and Vid_R and a synchronization signal Sync to the headset 300. The video data Vid_L designates a gradation level of each pixel constituting a video for a left eye by, for example, 8 bits for each of red (R), green (G), and blue (B). The video data Vid_R similarly designates the gradation level of each pixel constituting a video for a right eye by 8 bits for each of RGB.

The synchronization signal Sync includes a vertical synchronization signal indicating a start of vertical scanning of the video data Vid_L or Vid_R, a horizontal synchronization signal indicating a start of horizontal scanning, and a dot clock signal indicating a timing of one pixel of the video data.

The headset 300 includes electro-optical devices 10L and 10R and an optical sensor 330. The electro-optical device 10L is for the left eye and the electro-optical device 10R is for the right eye, each of which is a micro-display for displaying a color image. In the electro-optical devices 10L and 10R, a plurality of pixel circuits, a drive circuit for driving the pixel circuits, and the like are integrated on a semiconductor substrate. The semiconductor substrate is typically a silicon substrate, but may be another semiconductor substrate.

In the present embodiment, it is possible to cause the wearer to perceive a depth and a stereoscopic effect by causing the electro-optical devices 10L and 10R to display different videos, to be specific, videos with disparity. However, when it is not necessary to allow perception of the stereoscopic effect and the like, the video data Vid_L and Vid_R are used in common, and the same video is displayed on the electro-optical devices 10L and 10R.

The optical sensor 330 detects brightness of ambient light of the headset 300. To be more specific, when the wearer of the headset 300 observes display images by the electro-optical devices 10L and 10R in a see-through state in which the display images are superimposed on the outside, the optical sensor 330 detects the brightness of the outside superimposed on the display images.

The brightness detected by the optical sensor 330 is converted into a digital value, for example, and is supplied to the electro-optical devices 10L and 10R as information Amb.

Figure 2:
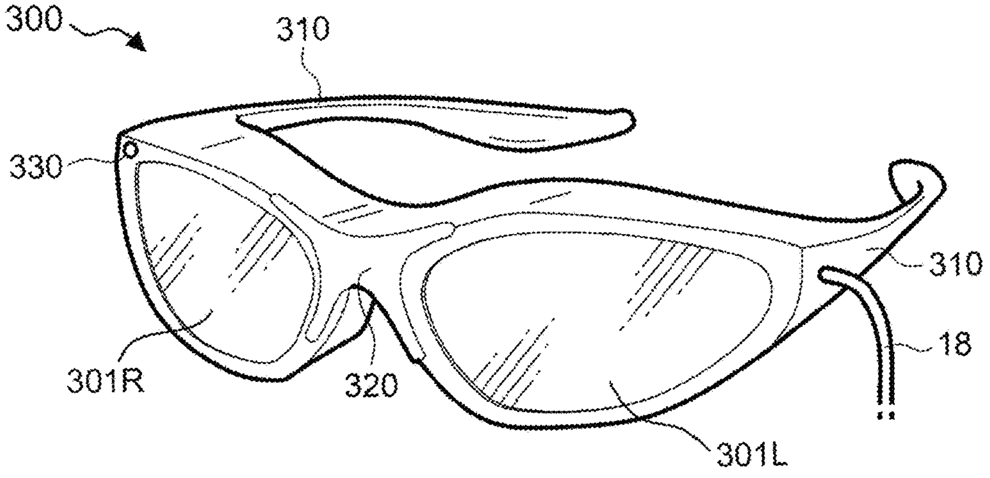
FIG. 2 is a perspective view illustrating a headset.
Figure 3:
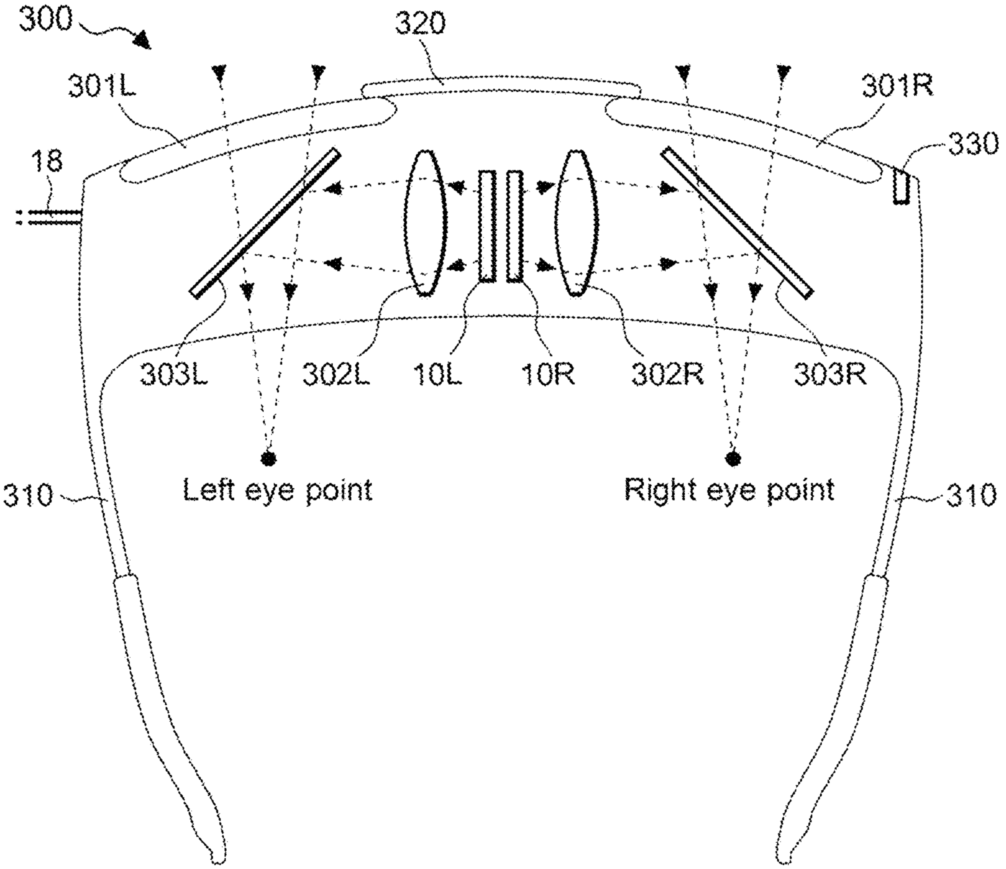
FIG. 3 is a diagram illustrating an optical configuration of the headset.

FIG. 2 is a perspective view illustrating the headset 300 in the head mounted display system 1, and FIG. 3 is a diagram illustrating an optical configuration of the headset 300.

As illustrated in FIG. 2, the headset 300 externally includes temples 310, a bridge 320, and lenses 301L and 301R as in the case of general glasses. In addition, as illustrated in FIG. 3, in the headset 300, the electro-optical device 10L for a left eye and the electro-optical device 10R for a right eye are provided in the vicinity of the bridge 320 and on the back side (the lower side in the drawing) of the lenses 301L and 301R.

An image display surface of the electro-optical device 10L is disposed to be on the left side in FIG. 3. Thus, a display image by the electro-optical device 10L is output via an optical lens 302L in a 9-o'clock direction in the drawing. A half mirror 303L reflects the display image by the electro-optical device 10L in a 6-o'clock direction, while the half mirror 303L transmits light incident in a 12-o'clock direction. An image display surface of the electro-optical device 10R is disposed on the right side opposite to the electro-optical device 10L. Thus, the display image by the electro-optical device 10R is output via the optical lens 302R in a 3-o'clock direction in the drawing. A half mirror 303R reflects the display image by the electro-optical device 10R in a 6-o'clock direction, while the half the mirror 303R transmits light incident in a 12-o'clock direction.

With this configuration, the wearer of the headset 300 can observe the display images by the electro-optical devices 10L and 10R in a see-through state.

There is no difference in the electrical configuration between the electro-optical devices 10L and 10R. Therefore, the electro-optical devices 10L and 10R will be generally described as an electro-optical device 10 to which the video data Vid is supplied when it is not necessary to describe the electro-optical devices 10L and 10R separately for left eye and right eye.

Figure 4:
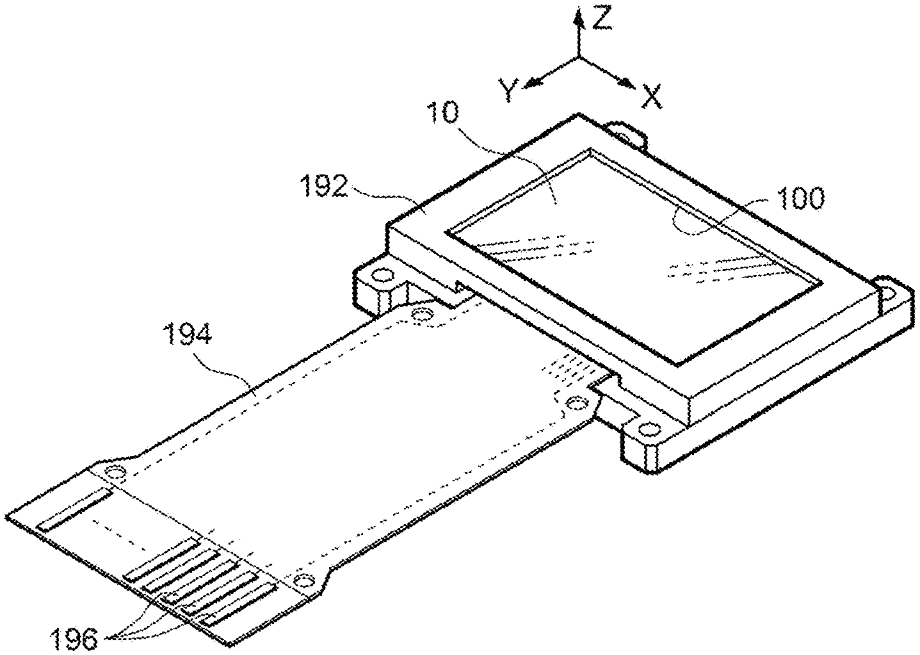
FIG. 4 is a perspective view illustrating the electro-optical device.

FIG. 4 is a perspective view illustrating a configuration of the electro-optical device 10. As illustrated in the drawing, the electro-optical device 10 is accommodated in a frame-shaped case 192 that is exposed in a display region 100. The electro-optical device 10 is coupled to one end of an FPC board 194. Note that FPC is an abbreviation for flexible printed circuit. The other end of the FPC board 194 is coupled to a relay board (not illustrated) in the headset 30. The video data Vid_L and Vid_R and the synchronization signal Sync are supplied from the main controller 20 to the relay board via the cable 18 and are distributed to the electro-optical devices 10R and 10L.

That is, the video data Vid_L and the synchronization signal Sync are supplied to the electro-optical device 10L from the main controller 20 via the cable 18, the relay board, and the FPC board 194 in order. In addition, the video data Vid_R and the synchronization signal Sync are supplied to the electro-optical device 10R from the main controller 20 via the cable 18, the relay board, and the FPC board 194 in order.

In addition, in FIG. 4, an X direction indicates an extending direction of a scanning line in the electro-optical device 10, and a Y direction indicates an extending direction of a data line. A two-dimensional plane defined in the X direction and the Y direction is a substrate surface of a semiconductor substrate. A Z direction is perpendicular to the X direction and the Y direction and is an emission direction of light emitted from an OLED.

Figure 5:
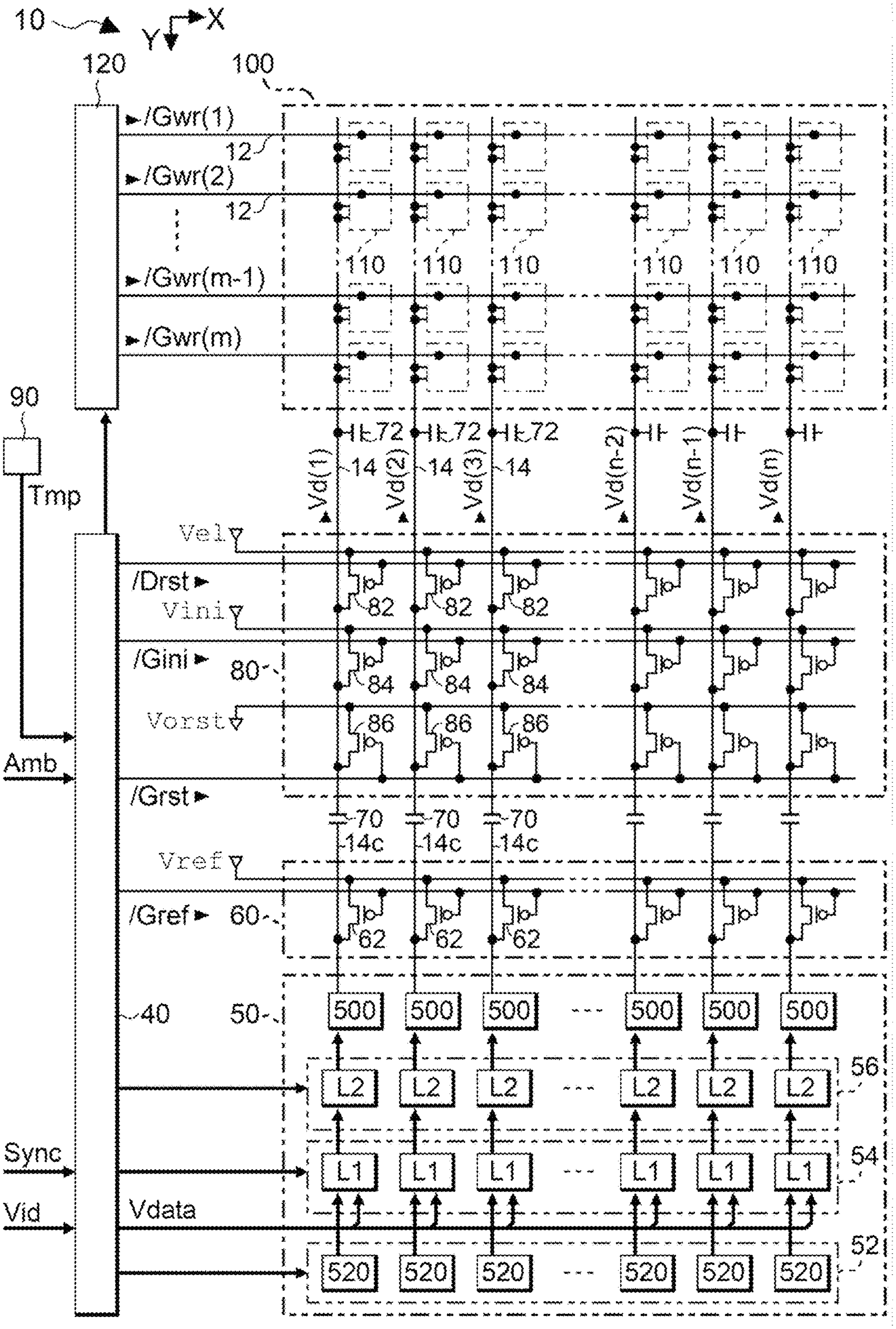
FIG. 5 is a block diagram illustrating an electrical configuration of the electro-optical device.

FIG. 5 is a block diagram illustrating an electrical configuration of the electro-optical device 10. As illustrated, the electro-optical device 10 includes a control circuit 40, a data signal output circuit 50, an auxiliary circuit 60, n capacitance elements 70, an initialization circuit 80, a temperature sensor 90, a display region 100, and a scanning line drive circuit 120.

In the display region 100, scanning lines 12 of m rows are provided in the X direction in the drawing, and data lines 14 of n columns are provided in the Y direction to be electrically insulated from each of the scanning lines 12. Each of m and n is an integer equal to or greater than 2.

In the display region 100, pixel circuits 110 are provided corresponding to the intersections of the scanning lines 12 of the m rows and the data lines 14 of the n columns. Therefore, the pixel circuits 110 are arranged in a matrix of m rows and n columns. To distinguish the rows from each other in the array of the matrix, the rows may be referred to as first, second, third . . . (m−1)-th, and m-th rows in order from the top in the drawing. Similarly, to distinguish the columns from each other in the matrix, the columns may be referred to as first, second, third . . . (n−1)-th, and n-th columns in order from the left in the drawing.

In order to generalize and describe the scanning lines 12, integers (i−1) and i of 1 or more and m or less are used. In order to generalize and describe the data lines 14, an integer j of 1 or more and n or less is used.

The temperature sensor 90 is formed at the electro-optical device 10 (semiconductor substrate) and detects an ambient temperature. The temperature detected by the temperature sensor 90 is converted into, for example, a digital value, and is supplied to the control circuit 40 as information Tmp.

The control circuit 40 controls each portion in accordance with the video data Vid and the synchronization signal Sync supplied from the main controller 20 in addition to the information Amb and Temp.

In the embodiment, the pixels of the image to be displayed and the pixel circuits 110 in the display region 100 correspond one-to-one with each other.

A characteristic of the brightness indicated by the gradation level in the video data Vid supplied from a host device does not necessarily match a characteristic of the brightness of the OLED included in the pixel circuits 110. Therefore, in order to cause the OLED to emit light at the brightness corresponding to the gradation level designated by the video data Vid, the control circuit 40 up-converts 8 bits of the video data Vid to, for example, 10 bits in the embodiment, and outputs the video data Vdata. Therefore, the gradation level is also designated for the 10-bit video data Vdata. That is, the video data Vdata designates a gradation level obtained by converting the gradation level designated by the video data Vid.

A look-up table in which a correspondence relationship between the 8 bits of the video data Vid which is an input and the 10 bits of the video data Vdata which is an output is stored in advance is used in the up-conversion.

In addition, the control circuit 40 generates various control signals for controlling each portion, which will be described in detail below.

The scanning line drive circuit 120 is a circuit for outputting various signals and driving the pixel circuits 110 arranged in m rows and n columns for each row in accordance with the control by the control circuit 40. For example, the scanning line drive circuit 120 sequentially supplies scanning signals /Gwr(1), /Gwr(2) . . . /Gwr(m−1), and /Gwr(m) to the scanning lines 12 of the first, second, third . . . (m−1)-th, and m-th rows. In general, the scanning signal supplied to the scanning line 12 of the (i−1)-th row is denoted by /Gwr(i−1). The scanning line drive circuit 120 outputs various control signals in addition to the scanning signals /Gwr(1) to /Gwr(m).

The data signal output circuit 50 is a circuit for outputting a signal of a voltage corresponding to the brightness to the pixel circuit 110 located in a row selected (horizontally scanned) by the scanning line drive circuit 120. More specifically, the data signal output circuit 50 includes a selection circuit group 52, a first latch circuit group 54, a second latch circuit group 56, and n DA conversion circuits 500.

The selection circuit group 52 includes selection circuits 520 in one-to-one correspondence with the n columns, the first latch circuit group 54 includes first latch circuits L1 in one-to-one correspondence with the n columns, and the second latch circuit group 56 includes second latch circuits L2 in one-to-one correspondence with the n columns. The n DA conversion circuits 500 correspond one-to-one to the n columns.

That is, a set of the selection circuit 520, the first latch circuit L1, the second latch circuit L2, and the DA conversion circuit 500 is provided corresponding to each column. Here, the selection circuit 520 of the j-th column instructs the first latch circuit L1 of the j-th column to select the video data of the j-th column among the video data Vdata output from the control circuit 40, and the first latch circuit L1 of the j-th column latches the video data Vdata according to the instruction. The second latch circuit L2 of the j-th column outputs the video data Vdata latched by the first latch circuit L1 of the j-th column to the DA conversion circuit 500 of the j-th column in the writing period (C) described below according to the control by the control circuit 40.

The DA converter circuit 500 of the j-th column converts the 10-bit video data Vdata output from the second latch circuit L2 of the j-th column into an analog signal, and outputs the analog signal to a data signal output line 14*c* of the j-th column. In other words, the data signal output lines 14*c* are provided in one-to-one correspondence with the data lines 14, and an output terminal of the DA conversion circuit 500 of the j-th column is coupled to the data signal output line 14*c* of the j-th column.

The auxiliary circuit 60 is an aggregate of transistors 62 provided in one-to-one correspondence with the data signal output lines 14*c*. A source node of the transistor 62 corresponding to the j-th column is coupled to a power supply line of a potential Vref, and a drain node of the transistor 62 is coupled to the data signal output line 14*c* of the j-th column. In addition, a control signal /Gref output from the control circuit 40 is commonly supplied to a gate node of the transistor 62 in each column.

The n capacitance elements 70 are provided in one-to-one correspondence with the sets of the data signal output lines 14*c* and the data lines 14. Specifically, one end of the capacitance element 70 of the j-th column is coupled to the data signal output line 14*c* of the j-th column, and the other end of the capacitance element 70 of the j-th column is coupled to the data line 14 of the j-th column. The video data Vdata corresponds to the gradation level designated by the video data Vid, the DA conversion circuit 500 converts the video data Vdata into an analog signal, and the analog signal is supplied to the data line 14 as a data signal via the capacitance element 70. Therefore, the potential of the data signal supplied to the data line 14 corresponds to the gradation level designated by the video data Vid and the video data Vdata.

The initialization circuit 80 is an aggregate of a set of transistors 82, 84, and 86 provided in one-to-one correspondence with the data lines 14.

A source node of the transistor 82 corresponding to the j-th column is coupled to the power supply line of a potential Vel, and a drain node of the transistor 82 is coupled to the data line 14 of the j-th column. In addition, a control signal /Drst output from the control circuit 40 is commonly supplied to a gate node of the transistor 82 in each column. The potential Vel is used as a high potential of a power supply voltage.

A source node of the transistor 84 corresponding to the j-th column is coupled to the power supply line of a potential Vini, and a drain node of the transistor 84 is coupled to the data line 14 of the j-th column. In addition, a control signal /Gini output from the control circuit 40 is commonly supplied to gate node of the transistor 84 in each column.

A source node of the transistor 86 corresponding to the j-th column is coupled to the power supply line of a potential Vorst, and a drain node of the transistor 86 is coupled to the data line 14 of the j-th column. In addition, a control signal /Grst output from the control circuit 40 is commonly supplied to a gate node of the transistor 86 in each column. The potential Vorst is, for example, a potential Gnd or a low potential close to the potential Gnd. Specifically, the potential Vorst is a potential at which a current does not flow through the OLED if power is supplied to the anode of the OLED.

A capacitance component is parasitic on the data line 14 of each column. In the drawing, the capacitance component is represented as a parasitic capacitance 72. That is, the parasitic capacitance 72 is electrically represented as a capacitance element in which one end is coupled to the data line 14 and the other end is coupled to a power supply line having a constant potential.

In addition, in the drawing, the potentials of the data lines 14 in the first, second . . . (n−1)-th, and n-th columns are denoted by Vd(1), Vd(2) . . . Vd(n−1), and Vd(n), respectively. To generalize, a potential of the data line 14 of a j-th column is denoted as Vd(j).

Figures 6, 7:
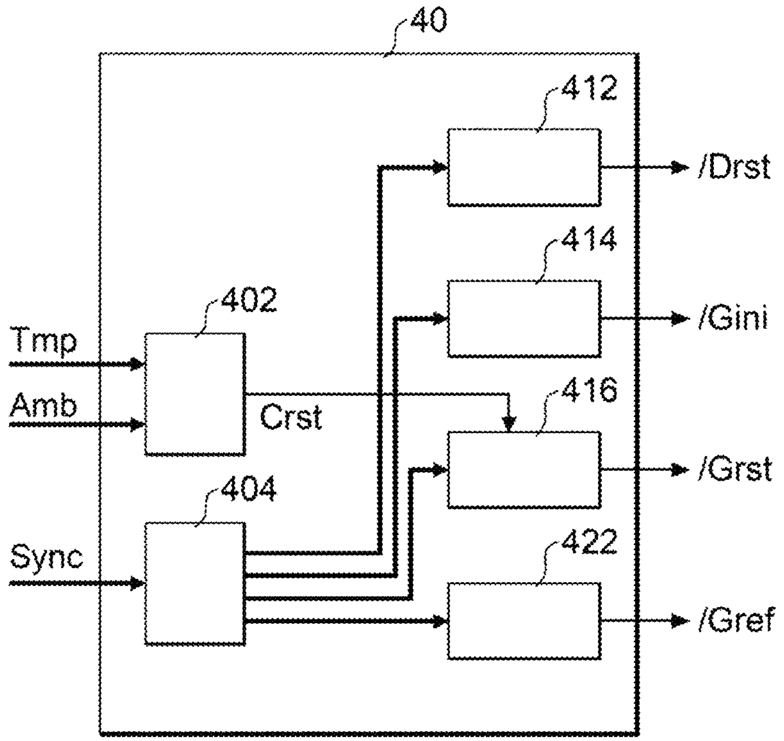
FIG. 6 is a block diagram of a control circuit in the electro-optical device.
FIG. 7 is a diagram illustrating a designation of an operation mode in the control circuit.

FIG. 6 is a block diagram illustrating a configuration of the control circuit 40 in the electro-optical device 10. In FIG. 6, only a configuration for generating various control signals in the control circuit 40 is illustrated, and a configuration for converting the video data Vid into the video data Vdata and outputting the video data Vdata and a configuration for controlling the data signal output circuit 50 and the scanning line drive circuit 120 are omitted.

As illustrated in this drawing, the control circuit 40 includes a determination unit 402, a generation control unit 404, and signal generation units 412, 414, 416, and 422.

The determination unit 402 determines whether reset operation is executed or the reset operation is not executed (non-reset operation is executed) according to the brightness indicated by the information Amb and the temperature indicated by the information Tmp, and designates a determination content by a logic level of a control signal Crst. The reset operation corresponds to first operation, and the non-reset operation corresponds to second operation.

The generation control unit 404 controls generation of control signals by the signal generation units 412, 414, 416, and 422. Specifically, the signal generation unit 412 generates the control signal /Drst, the signal generation unit 414 generates the control signal /Gini, the signal generation unit 416 generates the control signal /Grst, and the signal generation unit 422 generates the control signal /Gref. However, if the control signal Crst is at the H level, the signal generation unit 416 forcibly sets the control signal /Grst to the H level. Specific signal waveforms of the control signals /Drst, /Gini, /Grst and /Gref will be described below.

FIG. 7 is a diagram illustrating the determination in the determination unit 402. The determination unit 402 determines the brightness indicated by the information Amb and the temperature indicated by the information Tmp, and outputs the control signal Crst having the following logic level. That is, the determination unit 402 sets the control signal Crst to the L level when the brightness indicated by the information Amb is less than a threshold value Lth and the temperature indicated by the information Tmb is less than the threshold value Tth, and otherwise sets the control signal Crst to the H level.

Here, the control signal Crst designates whether to execute the reset operation or the non-reset operation. That is, if the detected brightness is lower than the threshold value Lth and the detected temperature is lower than the threshold value Tth, the reset operation is designated, and otherwise, the non-reset operation is designated.

Figure 8:
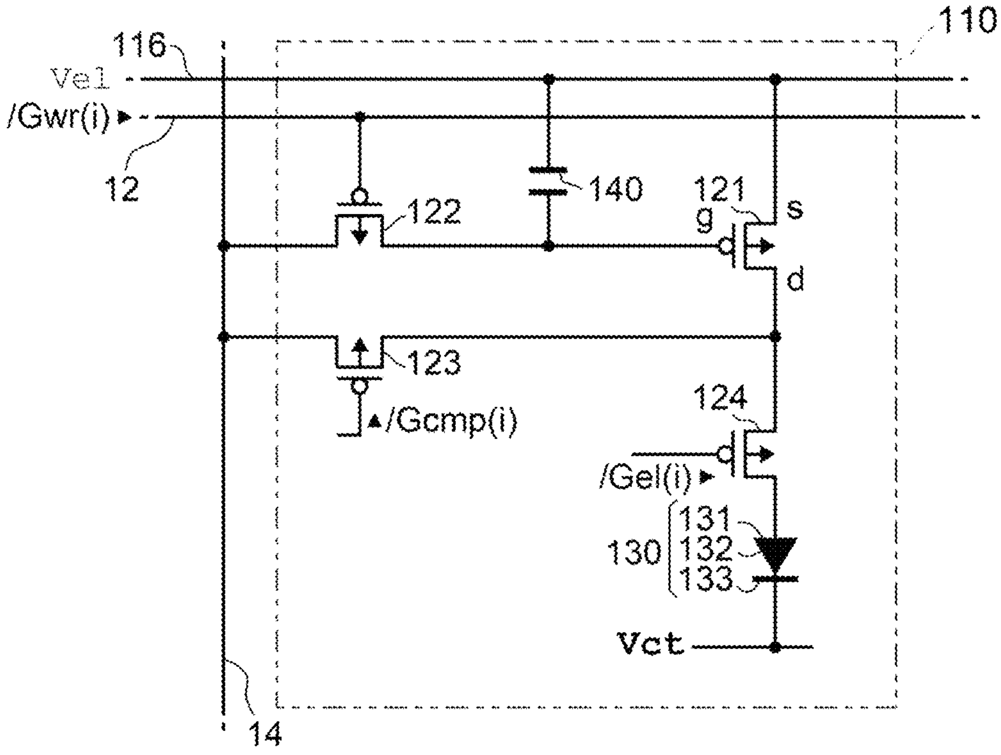
FIG. 8 is a diagram illustrating a pixel circuit of the electro-optical device.

FIG. 8 is a circuit diagram illustrating the pixel circuit 110. The pixel circuits 110 arranged in m rows and n columns are electrically identical to each other. Therefore, the pixel circuit 110 located in the i-th row and the j-th column is described as a representative of the pixel circuits 110.

As illustrated in the drawing, the pixel circuit 110 includes an OLED 130, p-type transistors 121 to 124, and a capacitance element 140. The transistors 121 to 124 are, for example, MOS transistors. Note that MOS is an abbreviation for metal-oxide-semiconductor field-effect transistor.

Further, in addition to a scanning signal /Gwr(i) corresponding to the i-th row, control signals /Gel(i) and /Gcmp(i) are supplied from the scanning line drive circuit 120 to the pixel circuit 110 of the i-th row.

The control signal /Gel(i) is a generalized representation of the control signals /Gel(1), /Gel(2) . . . /Gel(m−1), and /Gel(m) sequentially supplied corresponding to the first, second . . . (m−1)-th, and m-th rows. Similarly, the control signal /Gcmp(i) is a generalized representation of the control signals /Gcmp(1), /Gcmp(2) . . . /Gcmp(m), and /Gcmp(m) sequentially supplied corresponding to the first, second . . . (m−1)-th, and m-th rows.

The OLED 130 is a light-emitting element in which a light-emitting functional layer 132 is sandwiched between a pixel electrode 131 and a common electrode 133. The pixel electrode 131 serves as an anode, and the common electrode 133 serves as a cathode. The common electrode 133 is light-transmissive.

In the OLED 130, when a current flows from the anode to the cathode, holes injected from the anode and electrons injected from the cathode recombine in the light-emitting functional layer 132 to generate excitons, and white color light is generated.

In the case of color display, the generated white light resonates in an optical resonator constituted by, for example, a reflective layer and a semi-reflective and semi-transmissive layer (not illustrated), and is emitted at a resonance wavelength set corresponding to any one color of red (R), green (G), and blue (B). A color filter corresponding to the color is provided on the emission side of the light from the optical resonator. Therefore, the light emitted from the OLED 130 is sequentially colored by the optical resonator and the color filter and is visually recognized by the observer. Note that the optical resonator is not illustrated. In addition, when the electro-optical device 10 simply displays a monochrome image having only the brightness and darkness, the optical resonator and the color filter are omitted.

In the transistor 121 of the pixel circuit 110 of the i-th row and the j-th column, a gate node g is coupled to the drain node of the transistor 122, a source node s is coupled to the power supply line 116 to which the potential Vel is supplied, and a drain node d is coupled to the source node of the transistor 123 and the source node of the transistor 124. In the capacitance element 140, one end is coupled to the gate node g of the transistor 121, and the other end is coupled to the power supply line 116. Therefore, the capacitance element 140 holds the voltage between the gate node g and the source node s in the transistor 121.

The other end of the capacitance element 140 is coupled to a power supply line with a potential other than the power supply line 116 with the potential Vel as long as the potential is kept substantially constant.

In the embodiment, for example, a so-called MOS capacitor which is formed by interposing a gate insulating layer of a transistor between a semiconductor layer (lower electrode) and a gate electrode layer (upper electrode) of the transistor is used as the capacitance element 140. As the capacitance element 140, a parasitic capacitance of the gate node g of the transistor 121 may be used, or a so-called metal capacitance formed by interposing an insulating layer between conductive layers different from each other in the semiconductor substrate may be used.

In the transistor 122 of the pixel circuit 110 of the i-th row and the j-th column, the gate node is coupled to the scanning line 12 of the i-th row, and the source node is coupled to the data line 14 of the j-th column. In the transistor 123 of the pixel circuit 110 of the i-th row and the j-th column, the control signal /Gcmp(i) is supplied to the gate node, and the drain node is coupled to the data line 14 of the j-th column. In the transistor 124 of the pixel circuit 110 of the i-th row and the j-th column, the control signal /Gel(i) is supplied to the gate node, and the drain node is coupled to the pixel electrode 131 which is the anode of the OLED 130.

A potential Vct is supplied to the common electrode 133 serving as the cathode of the OLED 130. The potential Vct is, for example, the potential Gnd or a low potential close to the potential Gnd.

In the present description, "electrically coupled" or simply "coupled" means direct or indirect coupling or coupling between two or more elements, and includes, for example, coupling between two or more elements via different wiring layers and contact holes even if the two or more elements are not directly coupled in a semiconductor substrate.

The control circuit 40 controls driving of the pixel circuit 110 via the data signal output circuit 50, the auxiliary circuit 60, the initialization circuit 80, and the scanning line drive circuit 120. Therefore, the control circuit 40, the data signal output circuit 50, the auxiliary circuit 60, the initialization circuit 80, and the scanning line drive circuit 120 may be collectively referred to as a control circuit in a broad sense that controls the pixel circuit 110.

Next, the operation of the electro-optical device 10 will be described.

Figure 9:
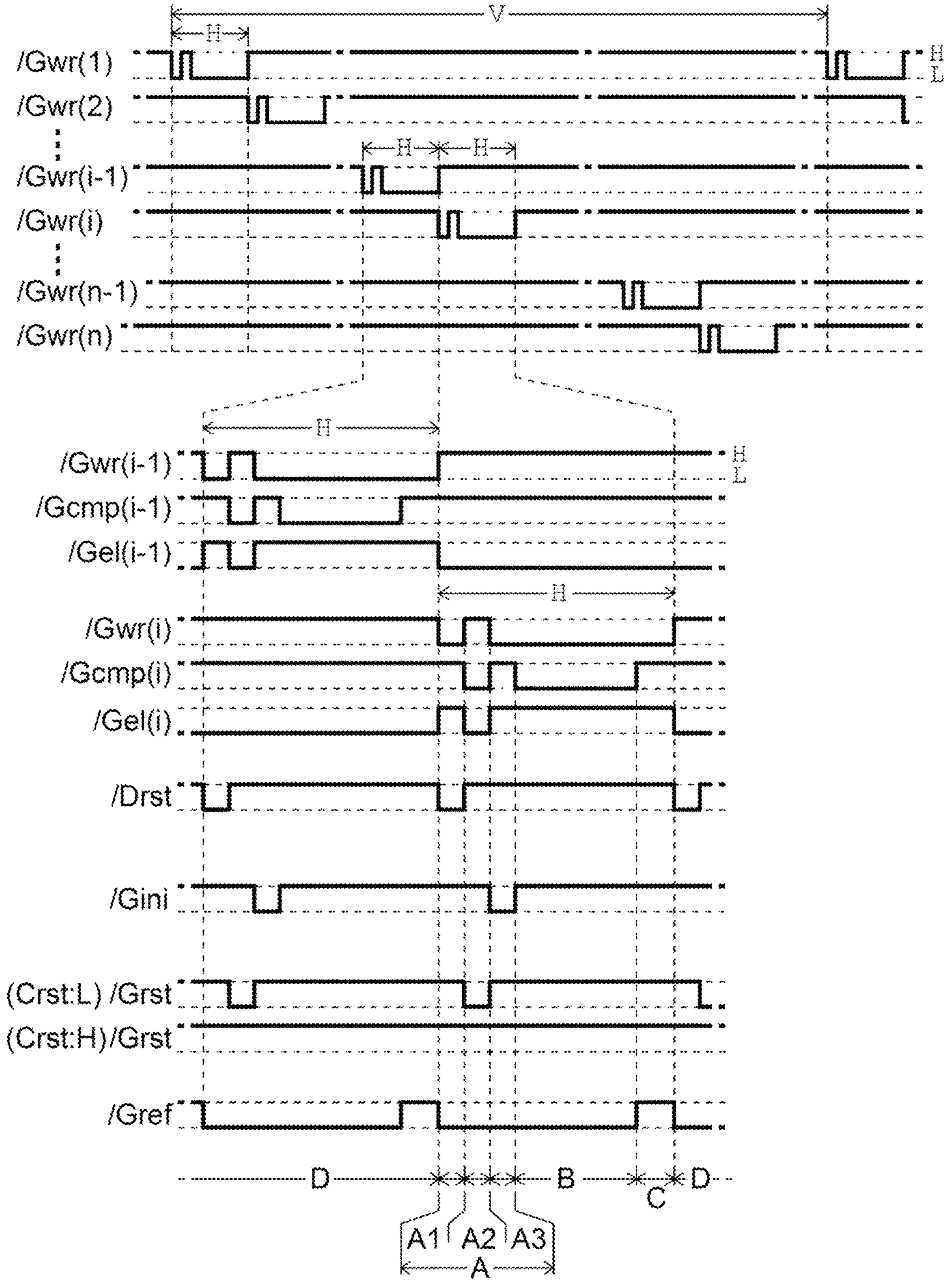
FIG. 9 is a timing chart illustrating operation of the electro-optical device.

FIG. 9 is a timing chart for explaining the operation of the electro-optical device 10. In the electro-optical device 10, the scanning lines 12 of m rows are horizontally scanned row by row in the order of first, second, third . . . and m-th rows in one frame (V). The frame (V) is a period required to display one frame of an image designated by the video data Vid. The temporal duration of the frame (V) is equal to that of the vertical synchronization vertical synchronization signal, for example, 16.7 milliseconds corresponding to one cycle of the vertical synchronization signal if the frequency of the period included in the synchronization signal Sync is 60 Hz. A period required for horizontal scanning of one row is a horizontal scanning period (H).

The operation in the horizontal scanning period (H) in each row is common to the pixel circuits 110. In addition, the operations of the pixel circuits 110 in the first to n-th columns of a row scanned in a certain horizontal scanning period (H) are substantially the same. Therefore, the following description will focus on the pixel circuit 110 of the i-th row and the j-th column.

In the electro-optical device 10, the horizontal scanning period (H) is divided into an initialization period (A), a compensation period (B), and a writing period (C) in order of time. Among them, the initialization period (A) is further divided into three initialization periods (A1), (A2) and (A3). As the operation of the pixel circuit 110, a light emission period (D) is further added in addition to the initialization period (A), the compensation period (B), and the writing period (C).

The initialization period (A1) is a period for setting the transistor 121 to an off-state. The initialization period (A2) is a period for resetting the anode potential in the OLED 130 when the control signal Crst is at the L level and the reset operation is designated. When the control signal Crst is at the H level and the non-reset operation is designated, the anode potential of the OLED 130 is not reset in the initialization period (A2).

The initialization period (A3) is a period for supplying, to the gate node g, the potential Vini for setting the transistor 121 to an on-state.

The compensation period (B) is a period for converging the potential of the gate node g of the transistor 121 to a potential corresponding to the threshold voltage of the transistor 121.

The writing period (C) is a period in which the potential corresponding to the gradation level is held (written) in the gate node g of the transistor 121, and in detail, is a period for changing the gate node g of the transistor 121 from the potential corresponding to the threshold voltage by the voltage corresponding to the current flowing through the OLED 130.

The light emission period (D) is a period for causing a current corresponding to the potential of the gate node g held in the writing period (C) to flow through the OLED 130 to emit light.

In the present description, the "on-state" of a transistor means that the path between a source node and a drain node of the transistor are electrically closed to be in a low impedance state. In addition, the "off-state" of the transistor refers to a state in which the path between the source node and the drain node are electrically opened to be in a high impedance state.

In the initialization period (A1) of each horizontal scanning period (H), the control signal /Drst is at the L level, the control signal /Gini is at the H level, and the control signal /Gref is at the L level. Therefore, the transistor 82 of each column is in the on-state, the transistor 84 of each column is in the off-state, and the transistor 62 of each column is in the on-state.

In the initialization period (A1), the control signal /Grst is at the H level regardless of the control signal Crst. Therefore, the transistor 86 of each column is in the off-state.

Further, in the initialization period (A1) of the horizontal scanning period (H) of the i-th row, the scanning signal /Gwr(i) is at the L level, the control signal /Gcmp(i) is at the H level, and the control signal /Gel(i) is at the H level. Therefore, in the initialization period (A1), in the pixel circuit 110 of the i-th row and the j-th column, the transistor 122 is in the on-state, the transistor 123 is in an off-state, and the transistor 124 is in the off-state.

Figure 10:
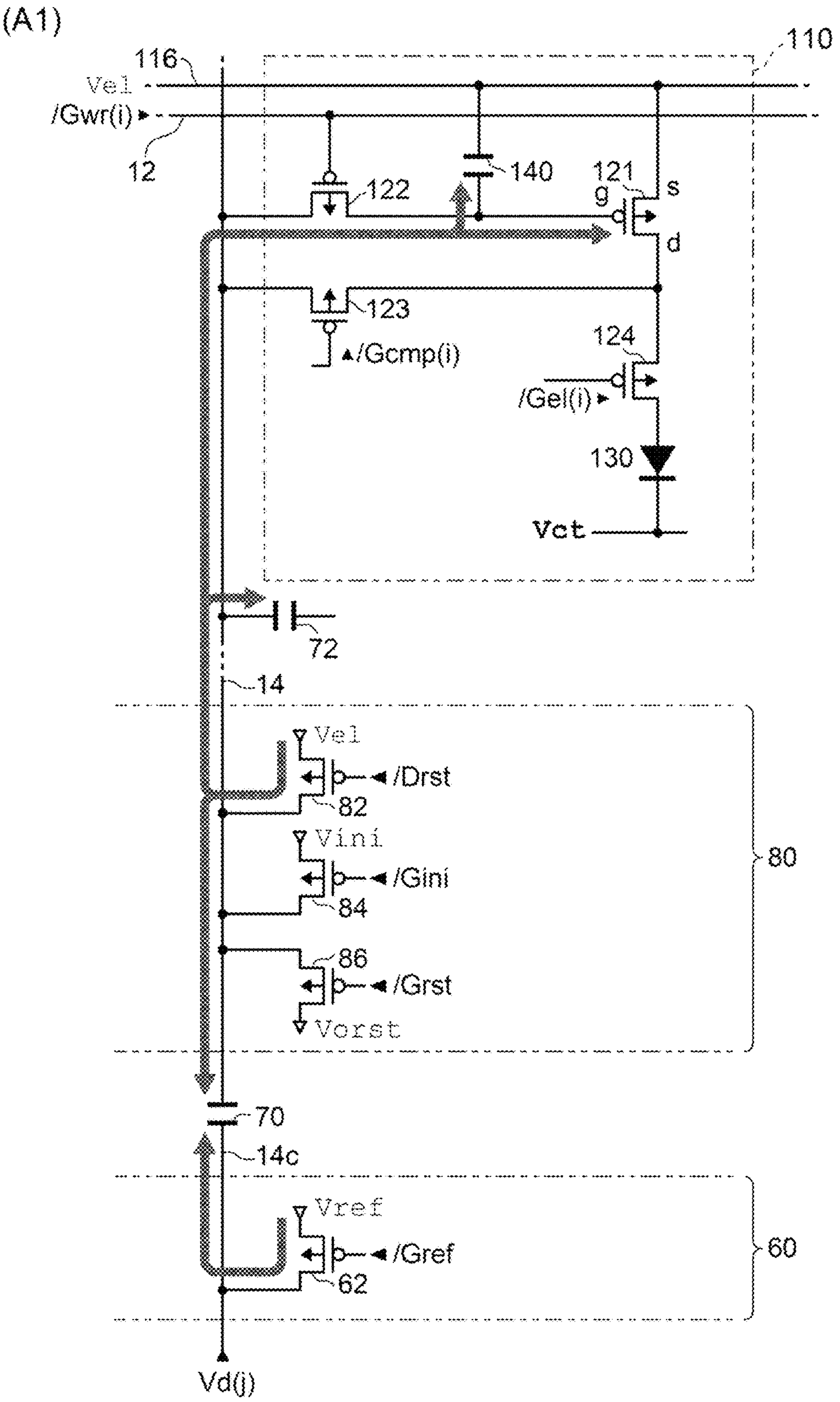
FIG. 10 is a diagram illustrating the operation of the electro-optical device.

Therefore, in the initialization period (A1), as illustrated in FIG. 10, in the pixel circuit 110 of the i-th row and the j-th column, the potential Vel is supplied to one end of the capacitance element 140 and the gate node g of the transistor 121 via the transistor 82, the data line 14 of the j-th column, and the transistor 122 in order. When the gate node g has the potential Vel, the voltage between the gate node g and the source node s becomes zero, so that the transistor 121 is forcibly in the off-state.

In the initialization period (A1), the data signal output line 14*c* of the j-th column has the potential Vref due to the on-state of the transistor 62.

Since the data line 14 of the j-th column has the potential Vel, the voltage between both ends of the capacitance element 70 becomes |Vel−Vref|, and one end of the parasitic capacitance 72 is held at the potential Vel. Since the potential Vel is at a high level of the power supply voltage, the capacitance element 70 and the parasitic capacitance 72 of the j-th column are charged.

In the initialization period (A2) of each horizontal scanning period (H), the control signal /Drst is changed to the H level, the control signal /Gini is maintained at the H level, and the control signal /Gref is maintained at the L level. Therefore, the transistor 82 of each column is changed to the off-state, the transistor 84 of each column is maintained in the off-state, and the transistor 62 of each column is maintained in the on-state.

In the initialization period (A2), the level of the control signal /Grst is designated by the control signal Crst. To be specific, in the initialization period (A2), when the control signal Crst is at the L level and the reset operation is designated, the control signal /Grst is changed to the L level. Therefore, the transistor 86 of each column is changed to the on-state.

In the initialization period (A2) of the horizontal scanning period (H) of the i-th row, the scanning signal /Gwr(i) is changed to the H level, the control signal /Gcmp(i) is changed to the L level, and the control signal /Gel(i) is changed to the L level. Therefore, in the pixel circuit 110 of the i-th row and the j-th column, the transistor 122 is changed to the off-state, the transistor 123 is changed to the on-state, and the transistor 124 is changed to the on-state.

Figure 11:
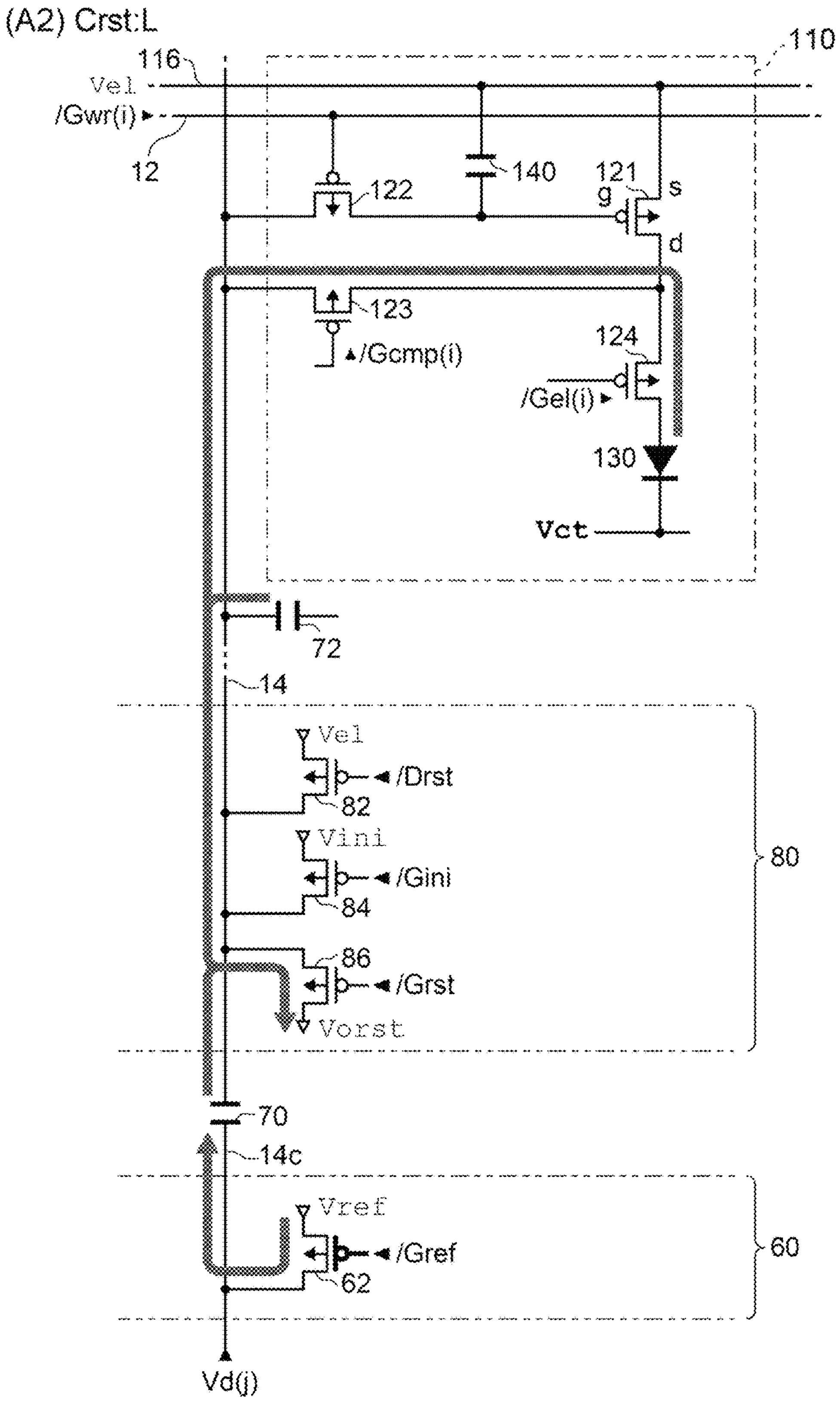
FIG. 11 is a diagram illustrating the operation of the electro-optical device.

In the initialization period (A2) in which the reset operation is designated, the transistor 86 is in the on-state, and the data line 14 of the j-th column has the potential Vorst. Therefore, in the initialization period (A2) in which the reset operation is designated, as illustrated in FIG. 11, the anode of the OLED 130 in the pixel circuit 110 of the i-th row and the j-th column is reset to the potential Vorst via the transistors 124 and 123, the data line 14 of the j-th column, and the transistor 86 in order (reset operation). In other words, the potential Vorst which is a predetermined potential is supplied to the anode of the OLED 130 via the transistors 124 and 123, the data line 14 of the j-th column, and the transistor 86 in order.

In the initialization period (A2), the potential of the data signal output line 14*c* of the j-th column is continuously the potential Vref from the initialization period (A1) by maintaining the on-state of the transistor 62.

In addition, since the data line 14 of the j-th column has the potential Vorst, the voltage between both ends of the capacitance element 70 becomes |Vorst−Vref|, and one end of the parasitic capacitance 72 is held at the potential Vorst. The potentials Vel and Vorst have a relationship satisfying Vel>Vorst, the capacitance element 70 and the parasitic capacitance 72 of the j-th column are discharged.

On the other hand, in the initialization period (A2), when the control signal Crst is at the H level and the non-reset operation is designated, the control signal /Grst is maintained at the H level. Therefore, the transistor 86 of each column is maintained in the off-state.

Figure 12:
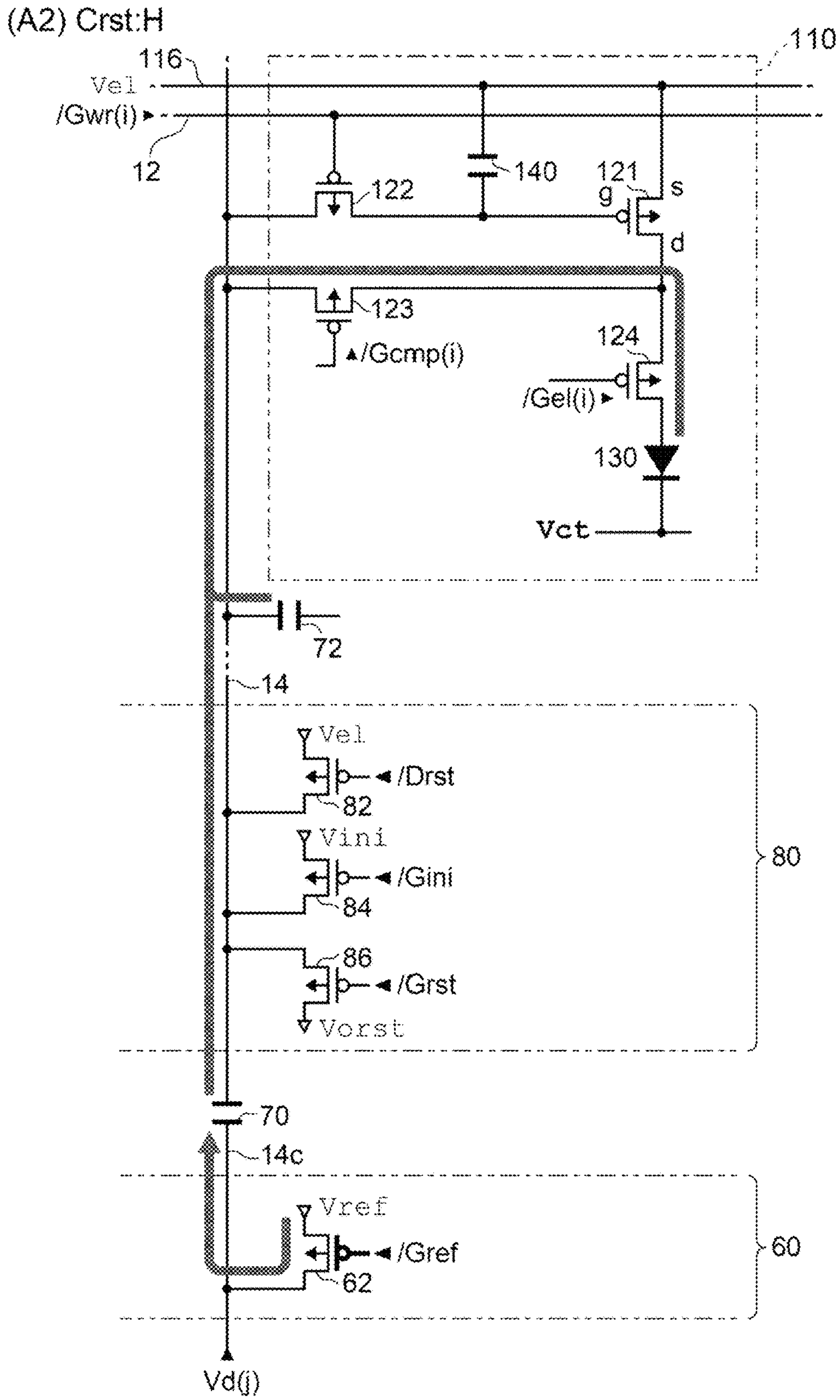
FIG. 12 is a diagram illustrating the operation of the electro-optical device.

In the immediately preceding initialization period (A1), the data line 14 has the potential Vel, and the potential Vel is held at the other end of the capacitance element 70 and one end of the parasitic capacitance 72. Therefore, in the OLED 130 in the pixel circuit 110 of the i-th row and the j-th column, as illustrated in FIG. 12, electric charges flow out from the capacitance element 70 and the parasitic capacitance 72, and move toward the OLED 130 via the data line 14 and the transistors 123 and 124 in order (non-reset operation).

When the parasitic capacitance of the OLED 130 is fully charged by the electric charges flowing out from the capacitance element 70 and the parasitic capacitance 72, the electric charges overflow and flow to (the light-emitting functional layer 132 of) the OLED 130, and thus the OLED 130 may emit light.

In addition, since the capacitance element 70 and the parasitic capacitance 72 of the j-th column are discharged due to the outflow of the electric charges, the potential of the data line 14 decreases from the potential Vel. The amount of the discharge is very small because the electric charge is distributed to the parasitic capacitance of the OLED 130 via the data line 14 of the j-th column.

Therefore, in the initialization period (A2) of the horizontal scanning period of the i-th row in which the non-reset operation is designated, the data line 14 of the j-th column and the anode of the i-th row and the j-th column have a potential between the potential Vorst and the potential Vel in a strict sense, but it may be said that the potential is substantially at the potential Vel.

In the initialization period (A3) of each horizontal scanning period (H), the control signal /Drst is maintained at the H level, the control signal /Gini is changed to the L level, and the control signal /Gref is maintained at the L level. Therefore, the transistor 82 of each column is maintained in the off-state, the transistor 84 of each column is changed to the on-state, and the transistor 62 of each column is maintained in the on-state.

After the initialization period (A3), the control signal /Grst is at the H level regardless of the control signal Crst. Therefore, the transistor 86 of each column is in the off-state.

In the initialization period (A3) of the horizontal scanning period (H) of the i-th row, the scanning signal /Gwr(i) is changed to the L level, the control signal /Gcmp(i) is changed to the H level, and the control signal /Gel(i) is changed to the H level. Therefore, in the pixel circuit 110 of the i-th row and the j-th column, the transistor 122 is changed to the on-state, the transistor 123 is changed to the off-state, and the transistor 124 is changed to the off-state.

Figure 13:
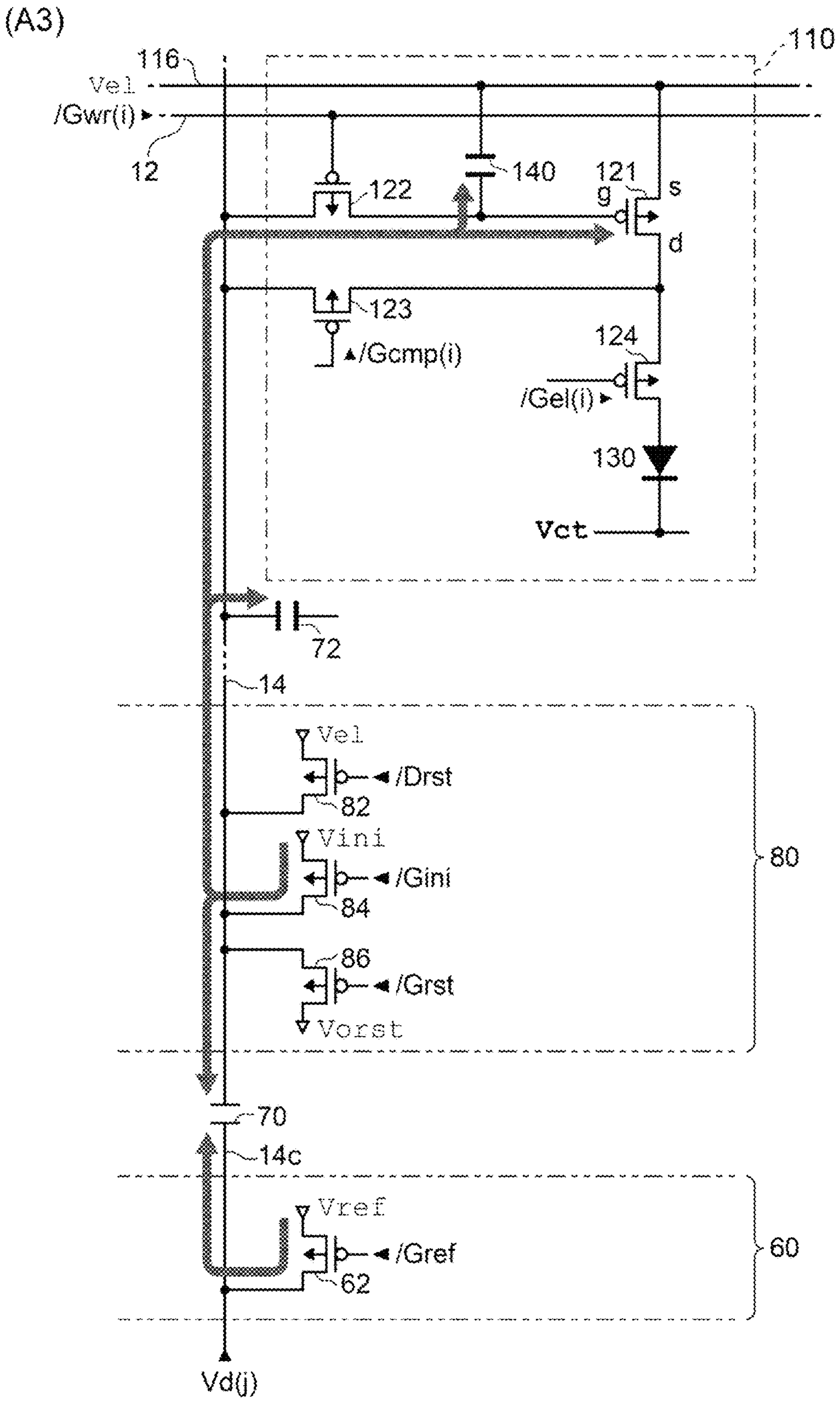
FIG. 13 is a diagram illustrating the operation of the electro-optical device.

Therefore, in the initialization period (A3), as illustrated in FIG. 13, in the pixel circuit 110 of the i-th row and the j-th column, the potential *Vini* is supplied to one end of the capacitance element 140 and the gate node g of the transistor 121 via the transistor 84, the data line 14 of the j-th column, and the transistor 122 in order.

In the initialization period (A3), the potential of the data signal output line 14*c* of the j-th column is continuously the potential Vref, continuing from the initialization period (A1) by maintaining the on-state of the transistor 62.

In addition, since the data line 14 of the j-th column has the potential Vini, the voltage between both ends of the capacitance element 70 becomes |Vini−Vref|, and one end of the parasitic capacitance 72 is held at the potential Vini. The potentials Vini and Vorst have a relationship satisfying (Vel>) Vini>Vorst.

Therefore, the capacitance element 70 and the parasitic capacitance 72 are charged when the reset operation is designated in the initialization period (A2), and undergo substantially no charging or discharging when the non-reset operation is designated.

FIG. 13 illustrates the case where the capacitance element 70 and the parasitic capacitance 72 are charged.

When the initialization period A3 ends, the compensation period (B) starts. In the compensation period (B) of each horizontal scanning period (H), the control signal /Drst is maintained at the H level, the control signal /Gini is changed to the H level, and the control signal /Gref is maintained at the L level. Therefore, the transistor 82 of each column is maintained in the off-state, the transistor 84 of each column is changed to the off-state, and the transistor 62 of each column is maintained in the on-state.

In the compensation period (B), the control signal /Grst is at the H level regardless of the control signal Crst. Therefore, the transistor 86 of each column is maintained in the off-state.

Further, in the compensation period (B) of the horizontal scanning period (H) of the i-th row, the scanning signal /Gwr(i) is maintained at the L level, the control signal /Gcmp(i) is changed to the L level, and the control signal /Gel(i) is maintained at the H level. Therefore, in the pixel circuit 110 of the i-th row and the j-th column, the transistor 122 is maintained in the on-state, the transistor 123 is changed to the on-state, and the transistor 124 is maintained in the off-state.

At the start of the compensation period (B), in the pixel circuit 110 of the i-th row, the gate node g of the transistor 121 is held at the potential Vini by the capacitance element 140. When the gate node g has the potential Vini, if the transistor 123 is in the on-state, the transistor 121 is diode-coupled.

Figure 14:
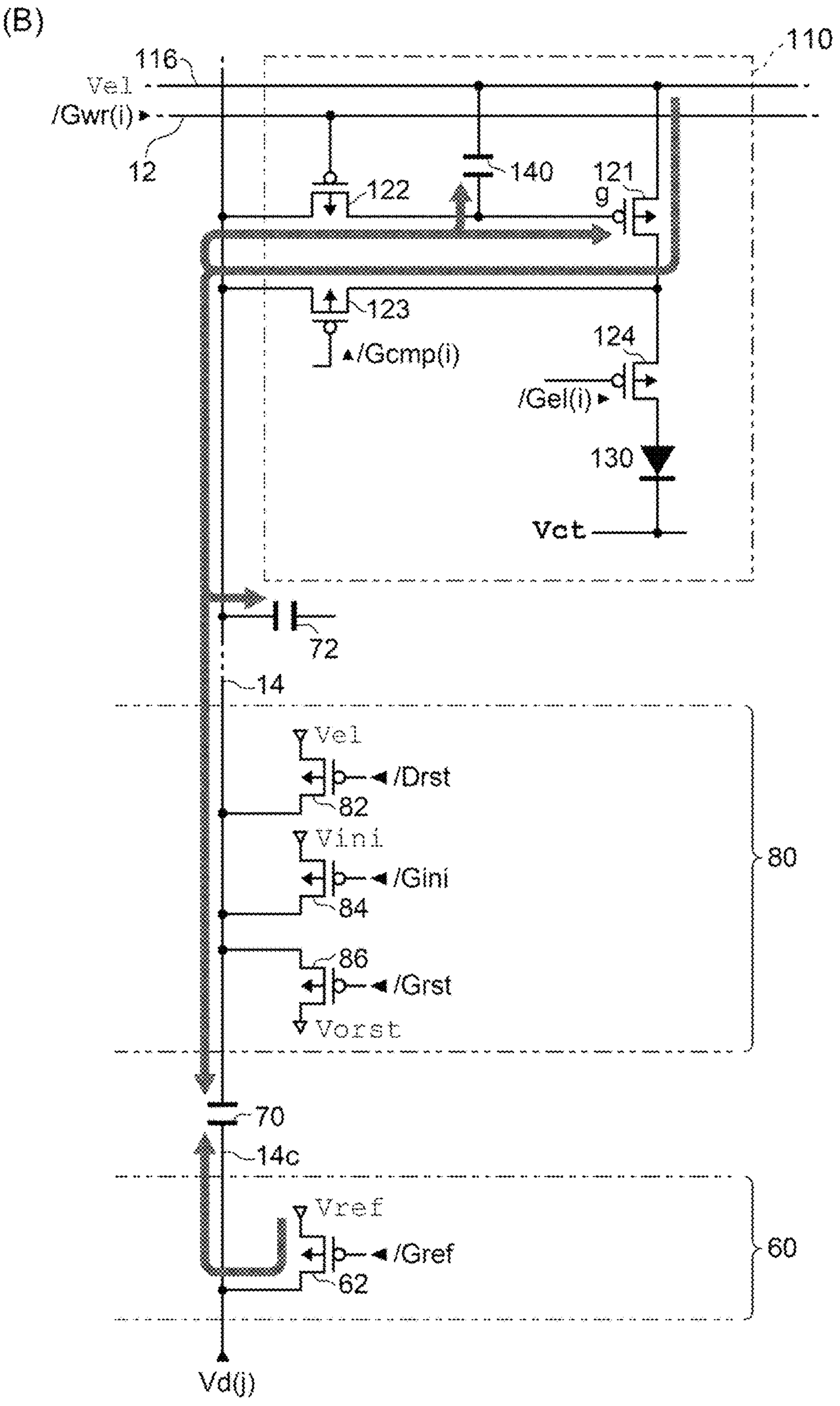
FIG. 14 is a diagram illustrating the operation of the electro-optical device.

Therefore, in the compensation period (B), as illustrated in FIG. 14, the voltage between the gate node g and the source node s in the transistor 121 converges on (a voltage close to) the threshold voltage Vth of the transistor 121. That is, the potential of the gate node g in the transistor 121 and the data line 14 converges on the threshold equivalent potential (Vel−Vth).

In the compensation period (B) of the i-th row, since the transistor 62 of each column is maintained in the on-state, the data signal output line 14*c* of each column is maintained at the potential Vref.

Since the data line 14 converges on the threshold equivalent potential (Vel−Vth), the voltage between both ends of the capacitance element 70 becomes |Vel−Vth−Vref|, and one end of the parasitic capacitance 72 is held at the threshold equivalent potential (Vel−Vth).

When the compensation period (B) ends, the writing period (C) starts. In the writing period (C) of each horizontal scanning period (H), the control signal /Drst is maintained at the H level, the control signal /Gini is maintained at the H level, and the control signal /Gref is changed to the H level. Therefore, the transistor 82 of each column is maintained in the off-state, the transistor 84 of each column is maintained in the off-state, and the transistor 62 of each column is changed to the off-state.

In the writing period (C), the control signal /Grst is at the H level regardless of the control signal Crst. Therefore, the transistor 86 of each column is maintained in the off-state.

In the writing period (C) of the horizontal scanning period (H) of the i-th row, the scanning signal /Gwr(i) is maintained at the L level, the control signal /Gcmp(i) is changed to the H level, and the control signal /Gel(i) is maintained at the H level. Therefore, in the pixel circuit 110 of the i-th row and the j-th column, the transistor 122 is maintained in the on-state, the transistor 123 is changed to the off-state, and the transistor 124 is maintained in the off-state.

In the writing period (C), while the transistor 62 of each column is changed to the off-state, the video data Vdata of 10 bits corresponding to the column of the i-th row is supplied to the DA conversion circuit 500 of each column. Therefore, the DA converter circuit 500 of the j-th column outputs a data signal having a potential corresponding to the gradation level of the i-th row and the j-th column to the data signal output line 14*c*.

Figure 15:
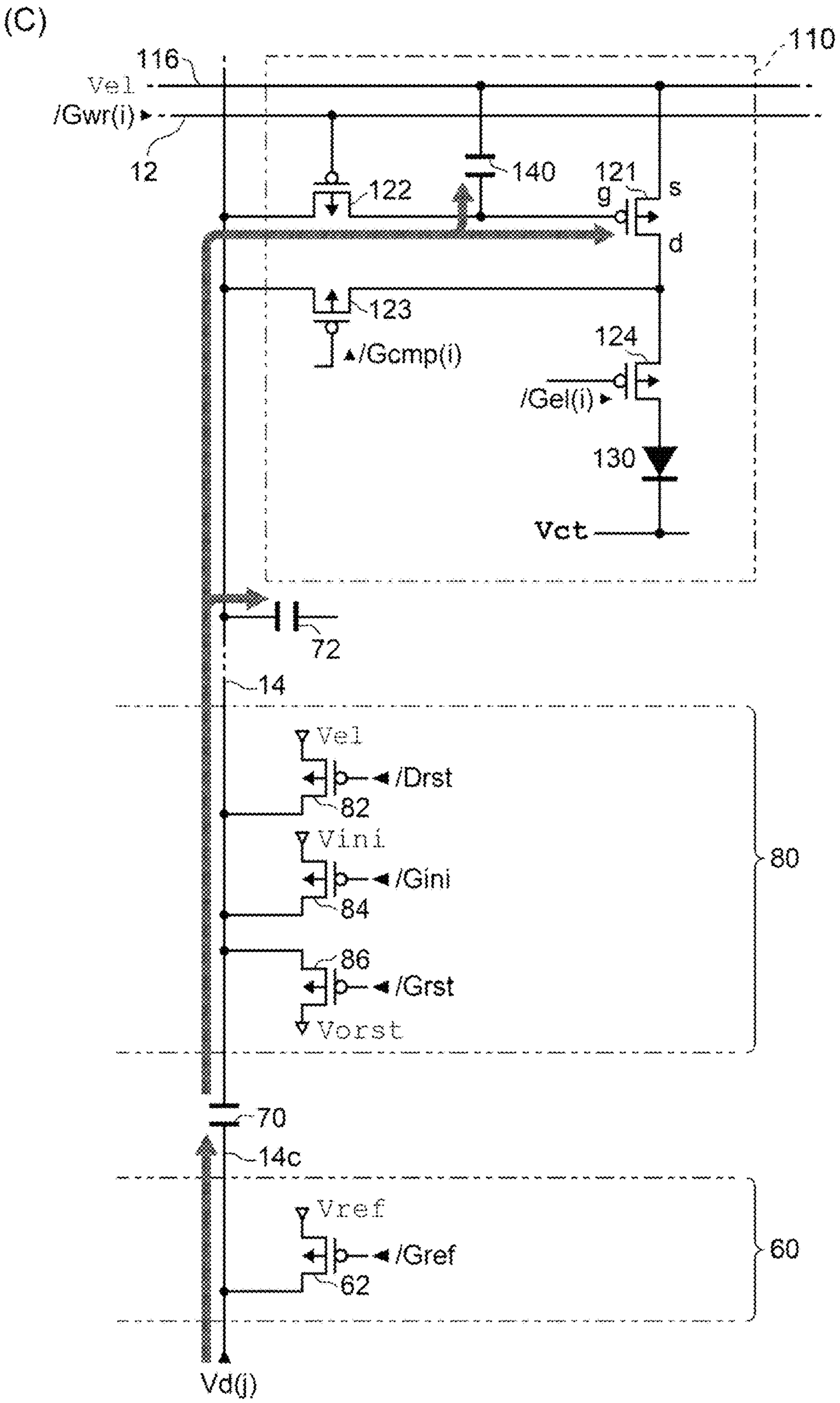
FIG. 15 is a diagram illustrating the operation of the electro-optical device.

Therefore, in the writing period (C), as illustrated in FIG. 15, the potential of one end of the capacitance element 70 of the j-th column is increased from the potential Vref to the potential of the gradation level corresponding to the i-th row and the j-th column. The potential is increased and reaches the gate node g of the transistor 121 via the capacitance element 70, the data line 14, and the transistor 122 in order.

The amount of potential change of the gate node g in the writing period (C) is a value obtained by multiplying the amount of potential increase at one end of the capacitance element 70 by the ratio of the capacitance value of the capacitance element 70 to the "combined capacitance value". Here, the "combined capacitance value" is the capacitance value of the combined capacitance of the capacitance element 70, the parasitic capacitance 72, and the capacitance element 140. The capacitance value of the capacitance element 140 can be ignored when it is sufficiently smaller than the other capacitance values.

When the scanning signal /Gwr(i) is changed to the H level, the writing period (C) of the i-th row ends. When the scanning signal /Gwr(i) is at the H level, the transistor 122 is in the off-state in the pixel circuit 110 of the i-th row and the j-th column, but the voltage of the difference between the potential of the gate node g and the potential Vel is held in the capacitance element 140.

After the end of the writing period (C), the light emission period (D) starts.

When the light emission period (D) of the i-th row is reached, the control signal /Gel(i) is inverted to the L level, and thus the transistor 124 is in the on-state.

Figure 16:
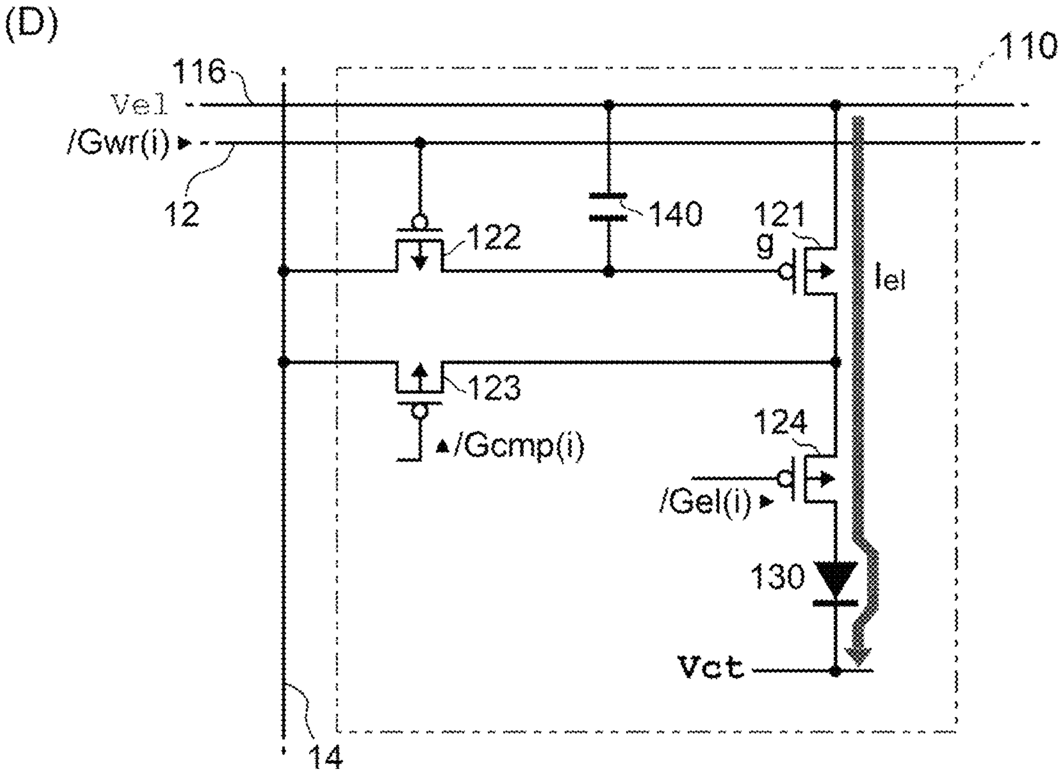
FIG. 16 is a diagram illustrating the operation of the electro-optical device.

Therefore, in the light emission period (D), as illustrated in FIG. 16, a current Iel corresponding to the potential of the gate node g held by the capacitance element 140 flows through the OLED 130 by the transistor 121. Therefore, the OLED 130 emits light at the brightness corresponding to the current Iel.

Although FIG. 16 illustrates an example in which the light emission period (D) of the i-th row starts immediately after the end of the writing period (C) of the i-th row, the light emission period (D) of the i-th row may start after the end of the writing period (C) of the i-th row and after the lapse of a predetermined period, for example, after the lapse of one horizontal scanning period (H).

Although FIG. 9 illustrates an example in which the light emission periods (D) are continuous, the period in which the control signal /Gel(i) is at the L level may be intermittent, may be changed in accordance with the adjustment of the brightness, or may be adjusted in accordance with the brightness indicated by the information Amb. Further, the level of the control signal /Gel(i) in the light emission period (D) may be an intermediate level between the H level and the L level.

In the horizontal scanning period (H) of the i-th row, the same operation is executed on the pixel circuits 110 of the first to n-th columns. In FIG. 16, attention is paid to the horizontal scanning period (H) of the i-th row, and the operation in the horizontal scanning period (H) is described. However, the same operation is sequentially executed in the horizontal scanning periods (H) of the first, second, third . . . and m-th rows.

The potential of the gate node g in the pixel circuit 110 of the i-th row and the j-th column is a potential that is changed from the threshold equivalent potential in the compensation period (B) in accordance with the gradation level of the i-th row and the j-th column. Since the same operation is executed in the other pixel circuits 110, in the embodiment, the current corresponding to the gradation level flows in the OLED 130 in a state where the threshold of the transistor 121 is compensated over all the pixel circuits 110 of m rows and n columns. Therefore, in the present embodiment, the variation in the brightness is reduced, and as a result, high-quality display can be performed.

The reason the reset operation for discharging the anode of the OLED 130 is performed is mainly as follows. In the OLED 130, since the light-emitting functional layer 132 is interposed between the pixel electrode 131 which is the anode and the common electrode 133 which is the cathode, capacitance is parasitic in the OLED 130. As described above, in the compensation period (B), the gate node g and the drain node d of the transistor 121 (the source node of the transistor 124) have the threshold equivalent potential. Next, in the writing period (C), a potential corresponding to the gradation level is supplied to the gate node g of the transistor 121.

If the black level (darkest level) of the lowest gradation is supplied to the gate node g, the gate node g is ideally at the potential Vel, but is actually at a potential lower than the potential Vel. Therefore, when the transistor 124 is in the on-state in the light emission period (D), a leakage current flows from the source node s to the drain node d in the transistor 121. If the electric charges accumulated in the parasitic capacitance of the OLED 130 are not reset in advance, a phenomenon occurs in which the parasitic capacitance is fully charged due to a leakage current, a current starts to flow through the OLED 130, and light is emitted. This phenomenon is referred to as "black floating" because although a black level is designated, that is, brightness at which light is not emitted is designated, light is slightly emitted and black is visually recognized as if floating.

Therefore, in the initialization period (A2) before the light emission period (D), the potential of the anode of the OLED 130 is set to the potential Vorst to discharge the anode in advance, thereby resetting the electric charges accumulated in the parasitic capacitance of the OLED 130. Accordingly, even when a leakage current flows through the transistor 121 in the light emission period (D), the parasitic capacitance of the OLED 130 is not fully charged by the leakage current, and light is not emitted. Therefore, it is possible to suppress so-called black floating.

However, the configuration in which the reset operation is performed may be a factor that hinders low power consumption.

Figure 17:
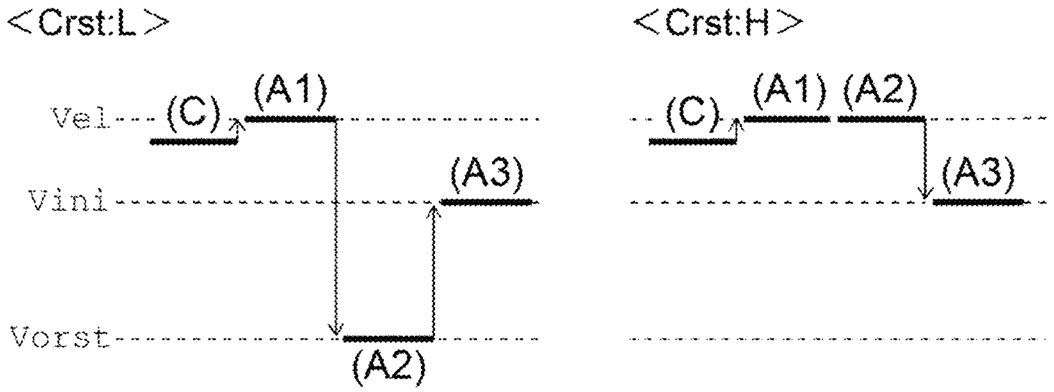
FIG. 17 is a diagram illustrating a transition of a data line potential in an initialization period.

FIG. 17 is a diagram illustrating how the potential of the data line 14 changes in the writing period (C) and the initialization periods (A1), (A2), and (A3) separately for the case where the reset operation is designated (the case where the control signal Crst is at the L level) and the case where the non-reset operation is designated (the case where the control signal Crst is at the H level).

When the reset operation is designated, the data line 14 has the potentials Vel, Vorst, and Vini in order in the initialization periods (A1), (A2), and (A3). As described above the potentials have a relationship satisfying Vel>Vini>Vorst.

In addition, the potential of the data line 14 before the initialization period (A1) is a potential corresponding to the gradation level of the previous row in the writing period (C) and is a potential between the potential Vini and the potential Vel.

Therefore, the capacitance element 70 and the parasitic capacitance 72 are charged as indicated by an upward arrow from the writing period (C) to the initialization period (A1). The capacitance element 70 and the parasitic capacitance 72 are discharged as indicated by a downward arrow from the initialization period (A1) to the initialization period (A2), and are charged from the initialization period (A2) to the initialization period (A3).

When the non-reset operation is designated, the data line 14 has the potentials Vel, Vel, and Vini in order in the initialization periods (A1), (A2), and (A3).

Therefore, although the capacitance element 70 and the parasitic capacitance 72 are charged from the writing period (C) to the initialization period (A1), charge and discharge hardly occur from the initialization period (A1) to (A2), and the capacitance element 70 and the parasitic capacitance 72 are discharged from the initialization period (A2) to (A3).

Therefore, the electric power consumed by the charge and discharge of the capacitance element 70 and the parasitic capacitance 72 of the data line 14 is smaller in the non-reset operation than in the reset operation. However, in the non-reset operation, black floating occurs as described above.

How the black floating is visually recognized will be described with reference to FIG. 18.

The wearer of the headset 300 visually recognizes a display image Dsp by the electro-optical devices 10L and 10R in a state of being superimposed on an external appearance Osp. The display image Dsp is visually recognized in a range narrower than that of the appearance Osp. Further, FIG. 18 is an example in which a text of the remaining battery level and the current time is displayed as the display image Dsp.

When the text is displayed in the display image Dsp, for example, white (light), black (dark), or a color complementary to the background color is selected as the display color of the text in order to improve visibility. In FIG. 18, as the display color of the text, white is selected when the background color is black (dark), and black is selected when the background color is white (light).

Figure 18:
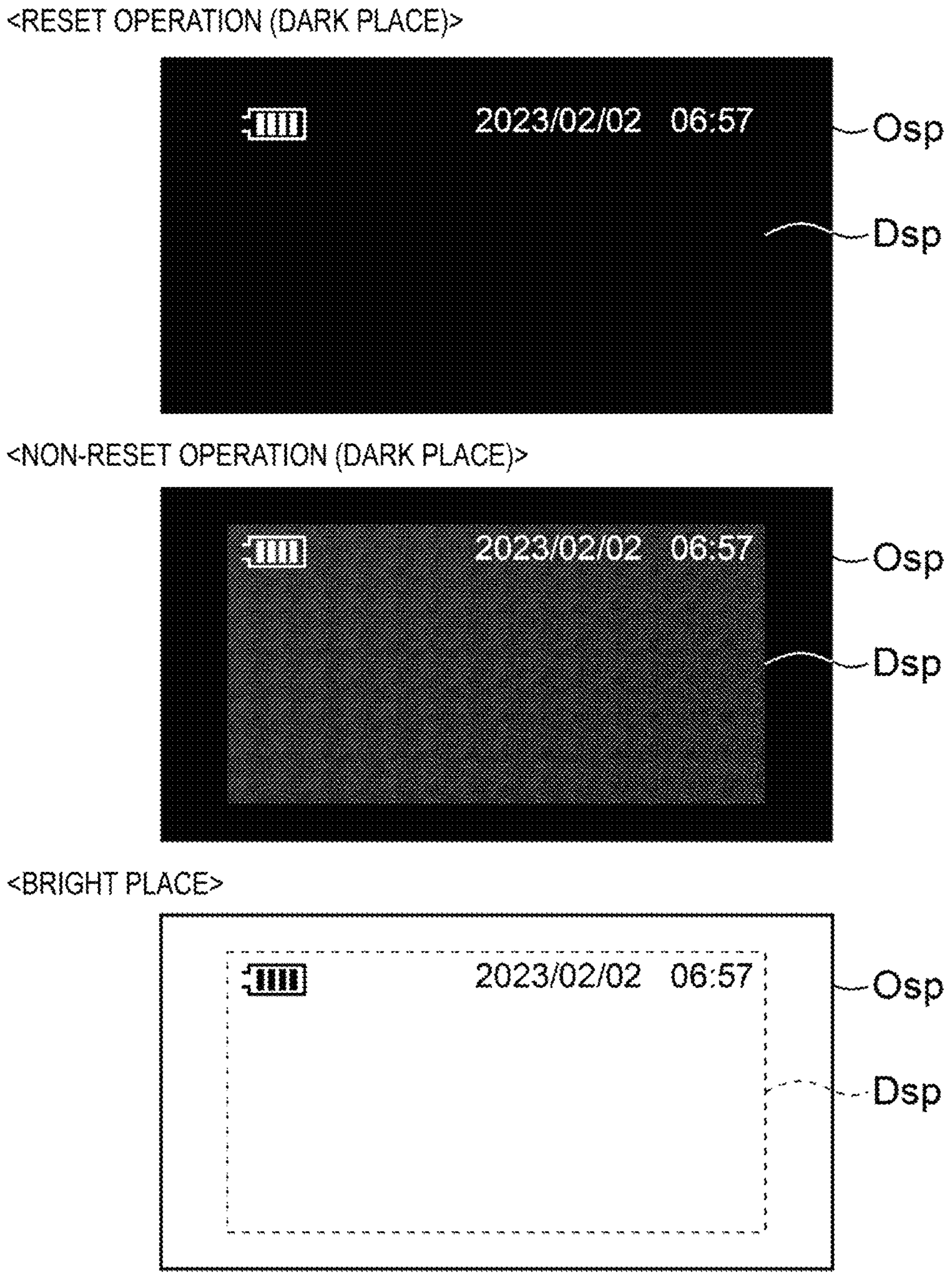
FIG. 18 is a diagram illustrating an example of an image visually recognized by a user wearing the headset.

As illustrated in the upper column of FIG. 18, when the background is black (dark) and the reset operation is performed, the black floating does not occur, and thus the difference between the display image Dsp and the appearance Osp is less likely to be visually recognized. As illustrated in the middle column of FIG. 18, when the background is black (dark) and the non-reset operation is performed, the black floating occurs. Specifically, the display image Dsp becomes brighter than the appearance Osp and is visually recognized as a rectangular window.

As illustrated in the lower column of FIG. 18, when the background is white (bright), the difference between the display image Dsp and the appearance Osp is hardly visually recognized regardless of the reset operation or the non-reset operation. This is because, when the electro-optical devices 10L and 10R display a bright image, even if the black floating occurs, the black floating is unlikely to be visually recognized as a difference in brightness.

In the first embodiment, when the brightness indicated by the information Amb is less than the threshold value Lth and the temperature indicated by the information Tmb is equal to or greater than the threshold value Tth, the non-reset operation is executed, and otherwise, the reset operation is executed.

Therefore, according to the first embodiment, since the reset operation or the non-reset operation is executed in accordance with the environment such as the surrounding brightness or temperature, the visibility of the black floating or the temperature rise is appropriately suppressed.

In the first embodiment, a configuration in which the non-reset operation is performed by setting the transistor 86 of each column to the off-state in the initialization period (A2) is adopted, but a configuration other than this may be adopted. Therefore, a second embodiment in which non-reset operation different from the non-reset operation in the first embodiment is performed to reduce power consumption will be described.

Figure 19:
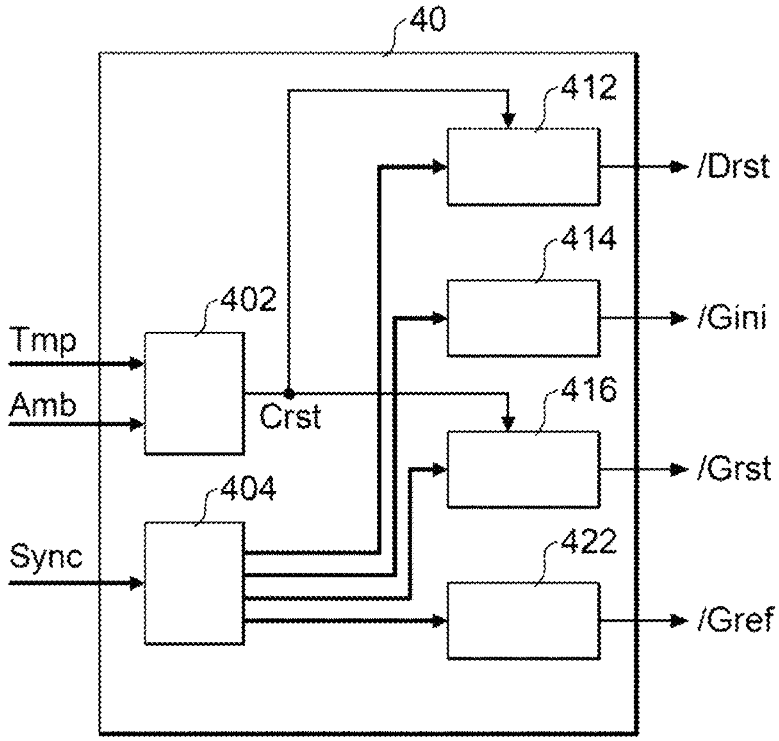
FIG. 19 is a block diagram of a control circuit in the electro-optical device according to a second embodiment.

FIG. 19 is a block diagram illustrating a configuration of the control circuit 40 in the electro-optical device 10 according to the second embodiment.

The control circuit 40 illustrated in FIG. 19 is different from that of the first embodiment illustrated in FIG. 6 in that the control signal Crst indicating the determination content by the determination unit 402 is supplied not only to the signal generation unit 416 but also to the signal generation unit 412.

Figure 20:
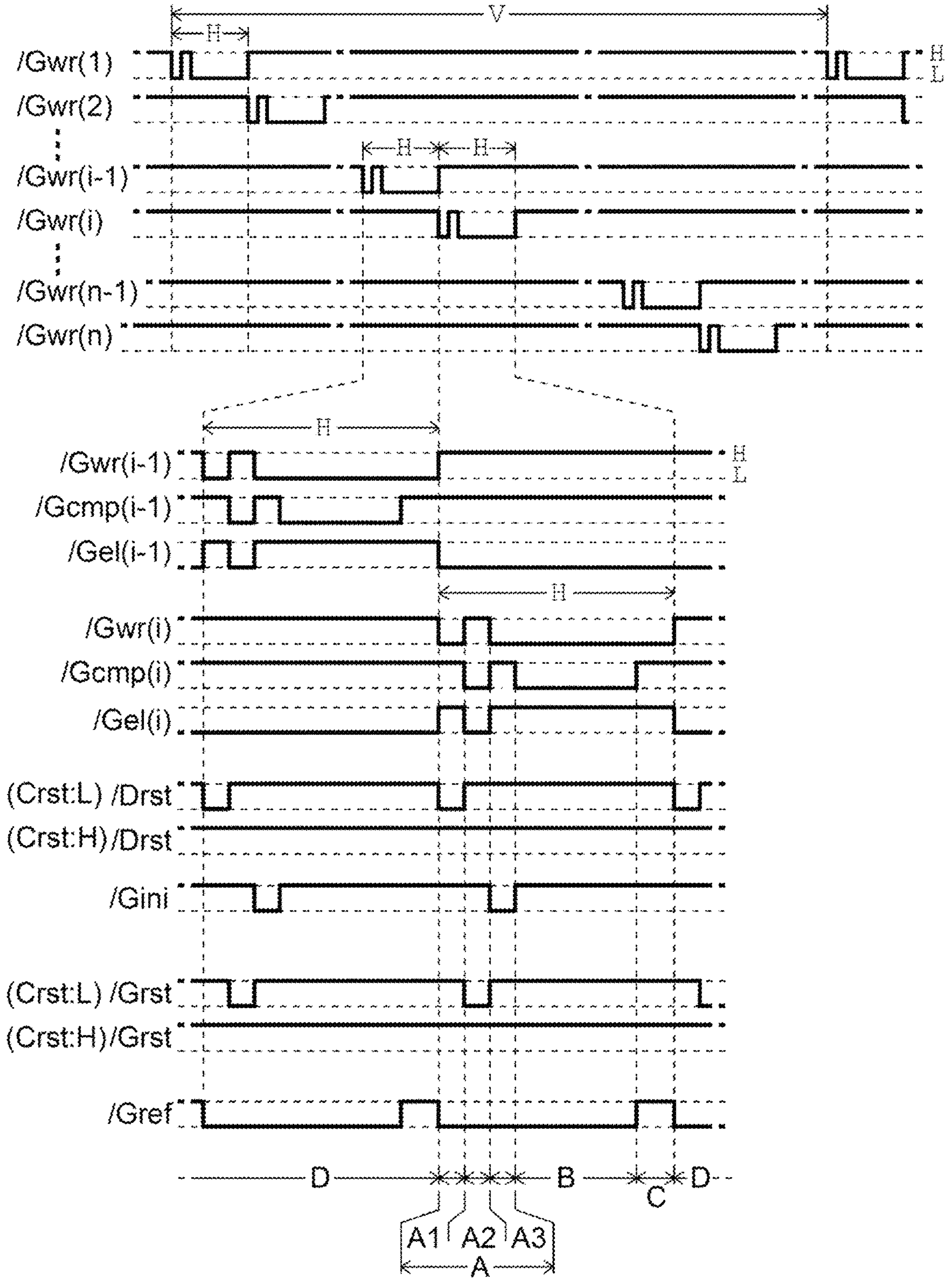
FIG. 20 is a timing chart illustrating the operation of the electro-optical device.

FIG. 20 is a timing chart for explaining the operation of the electro-optical device 10 according to the second embodiment.

When the control signal Crst is at the L level, in the initialization period (A1), the signal generation unit 412 according to the second embodiment outputs the control signal /Drst at the L level and outputs the control signal /Drst at the H level in other periods, similarly to the first embodiment. When the control signal Crst is at the H level, the signal generation unit 412 according to the second embodiment outputs the control signal /Drst at the H level in the entire period.

In other words, the second embodiment is different from the first embodiment only in that the control signal /Drst is output at the H level in the initialization period (A1) when the control signal Crst is at the H level and the non-reset operation is designated.

Therefore, in the second embodiment, this difference will be mainly described.

In the second embodiment, when the control signal Crst is at the L level, in the initialization period (A1) of the horizontal scanning period (H) of the i-th row, similarly to the first embodiment, the transistor 82 of each column is in the on-state, the transistor 84 of each column is in the off-state, and the transistor 62 of each column is in the on-state. In addition, in the initialization period (A1) of the second embodiment, when the control signal Crst is at the H level, the transistor 86 of each column is in the off-state.

The writing period (C) of the horizontal scanning period (H) of the (i−1)-th row is immediately before the initialization period (A1) of the horizontal scanning period (H) of the i-th row. In the writing period (C), the potential of the data line 14 of the j-th column is a potential corresponding to the gradation level of the i-th row and the (j−1)-th column, and is a potential between the potential Vini and the potential Vel. That is, immediately before the initialization period (A1) of the horizontal scanning period (H) of the i-th row, the data line 14, the other end of the capacitance element 70 and one end of the parasitic capacitance 72 are held at a potential corresponding to the gradation level of the i-th row and the (j−1)-th column.

In the initialization period (A1) of the horizontal scanning period (H) of the i-th row, in the pixel circuit 110 of the i-th row and the j-th column, the transistor 122 is in the on-state, the transistor 123 is in an off-state, and the transistor 124 is in the off-state.

Figure 21:
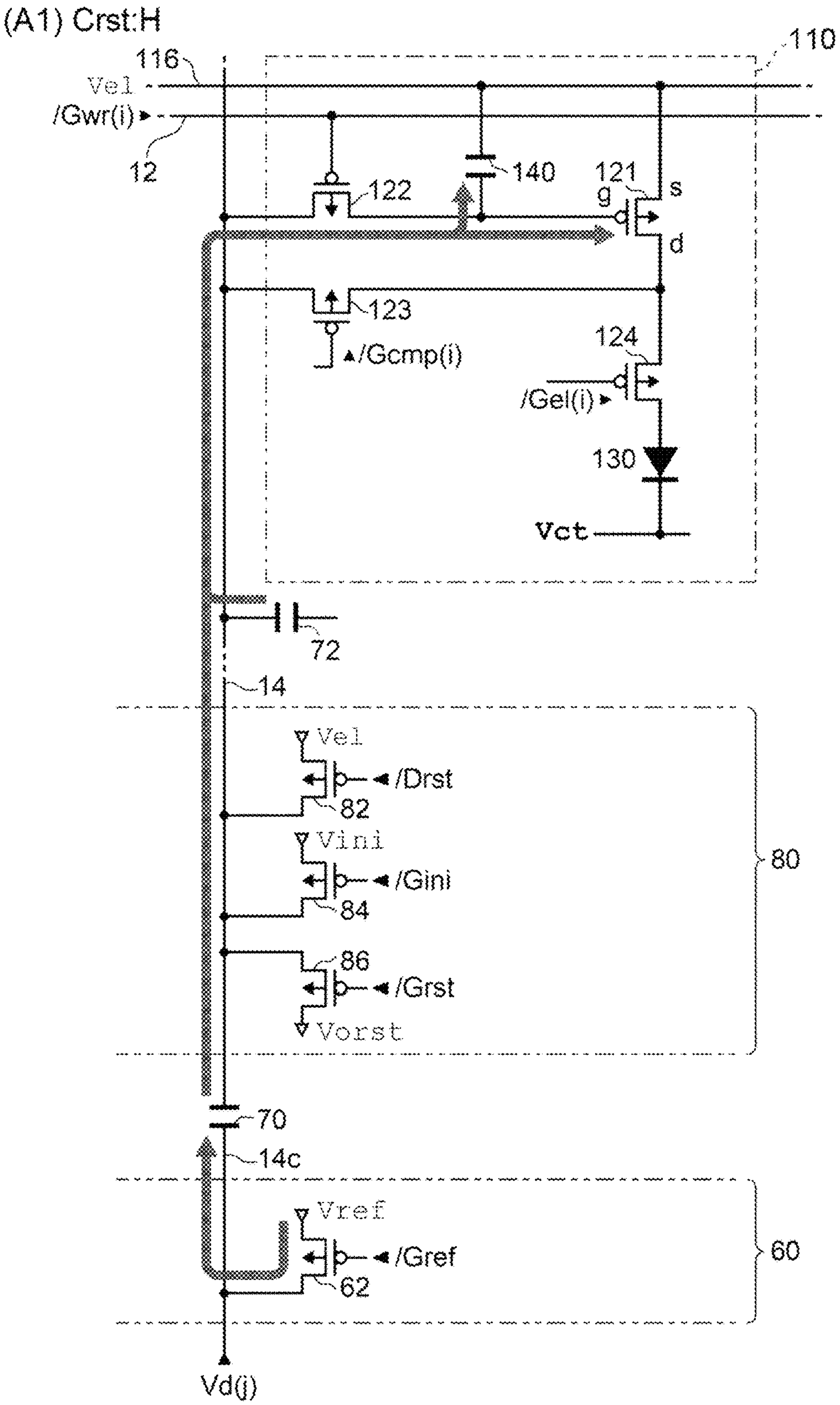
FIG. 21 is a diagram illustrating the operation of the electro-optical device.

Therefore, in the initialization period (A1) in which the control signal Crst is at the H level and the non-reset operation is designated, in the j-th column as illustrated in FIG. 21, the electric charges flow out from the capacitance element 70 and the parasitic capacitance 72, and flow toward the gate node g and one end of the capacitance element 140 in the pixel circuit 110 of the i-th row and j-th column via the data line 14 of the j-th column and the transistor 122 in order.

In addition, since the capacitance element 70 and the parasitic capacitance 72 of the j-th column are discharged due to the outflow of the electric charges, the potential of the data line 14 decreases. However, since this discharge is only to distribute the electric charges to one end of the capacitance element 140 via the data line 14 of the j-th column and is a very small amount, it may be said that the potential of the data line 14 does not fluctuate.

In the second embodiment, in the initialization period (A2) in which the control signal Crst is at the H level, similarly to the first embodiment, the transistor 82 of each column is in the off-state, the transistor 84 of each column is in the off-state, the transistor 86 of each column is in the off-state, and the transistor 62 of each column is in the on-state.

Therefore, in the initialization period (A2) in which the control signal Crst is at the H level and the non-reset operation is designated, as illustrated in FIG. 12 of the first embodiment, in the j-th column, the electric charges flow out from the capacitance element 70 and the parasitic capacitance 72 toward the anode of the OLED 130 via the data line 14 of the j-th, the transistors 123 and 124 in order. However, since the amount of discharge is very small, the potential of the data line 14 of the j-th column hardly changes from the initialization period (A1).

The second embodiment is the same as the first embodiment in that, in the initialization period (A3) of the horizontal scanning period (H) of the i-th row, as illustrated in FIG. 13, the potential Vini is supplied to the gate node g in the i-th row and one end of the capacitance element 140 via the transistor 84, the data line 14 of the j-th column and the transistor 122 in order.

Figure 22:
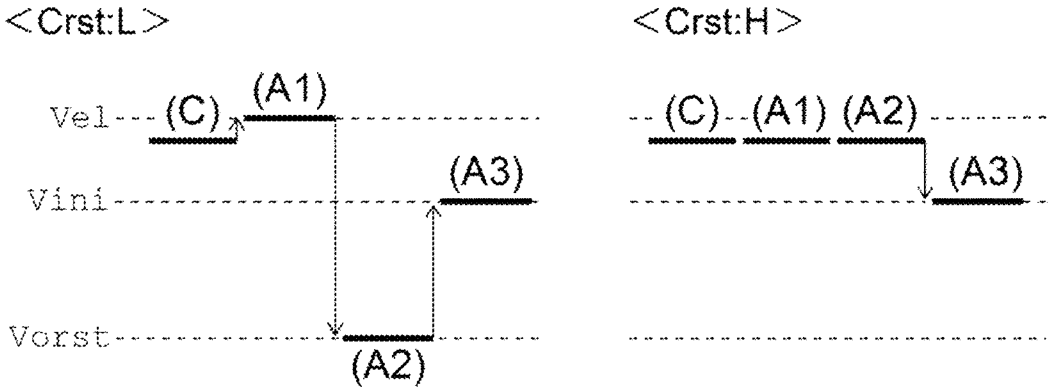
FIG. 22 is a diagram illustrating a transition of the data line potential in the initialization period.

FIG. 22 is a diagram illustrating how the potential of the data line 14 changes in the writing period (C) and the initialization periods (A1), (A2), and (A3) according to the second embodiment when the reset operation is designated and when the non-reset operation is designated.

When the control signal Crst is at the L level and the reset operation is designated, the potential variation of the data line 14 is the same as in the first embodiment. That is, the capacitance element 70 and the parasitic capacitance 72 are charged from the writing period (C) to the initialization period (A1), discharged from the initialization period (A1) to the initialization period (A2), and charged from the initialization period (A2) to the initialization period (A3).

When the control signal Crst is at the H level and the non-reset operation is designated, the potential of the data line 14 does not change from the previous writing period (C) in the initialization period (A1), does not change in the initialization period (A2), and becomes the potential *Vini* in the initialization period (A3).

Therefore, in the second embodiment, charge and discharge hardly occur in the writing period (C) to the initialization periods (A1) and (A2), and discharge occurs in the initialization periods (A2) to (A3).

Therefore, in the non-reset operation according to the second embodiment, power consumption can be reduced as compared with the non-reset operation according to the first embodiment because charge hardly occurs from the writing period (C) to the initialization period (A1).

In addition, in the second embodiment, similarly to the first embodiment, when the brightness indicated by the information Amb is less than the threshold value Lth and the temperature indicated by the information Tmb is less than the threshold value Tth, the reset operation is executed, and otherwise, the non-reset operation is executed. Therefore, according to the second embodiment, since the reset operation or the non-reset operation is executed according to the environment, the visibility of the black floating or the temperature rise is appropriately suppressed.

In the first embodiment and the second embodiment (hereinafter referred to as the embodiments) described above, various modifications or applications are possible as follows.

In the embodiments, a configuration is adopted in which the optical sensor 330 and the temperature sensor 90 are provided, the reset operation is executed when the brightness indicated by the information Amb is less than the threshold value Lth and the temperature indicated by the information Tmb is less than the threshold value Tth, and the non-reset operation is executed in other cases. The present disclosure is not limited to this configuration, and a configuration including only one of the sensors may be adopted.

In detail, in a configuration in which the optical sensor 330 is provided and the temperature sensor 90 is not provided, the reset operation is executed when the brightness indicated by the information Amb is less than the threshold value Lth, and the non-reset operation is executed when the brightness is equal to or greater than the threshold value Lth. According to this configuration, the occurrence of black floating is suppressed in a dark environment, whereas power consumption is reduced in a bright environment.

In addition, in a configuration in which the optical sensor 330 is not provided and the temperature sensor 90 is provided, the reset operation is executed when the temperature indicated by the information Tmb is less than the threshold value Tth, and the non-reset operation is executed when the temperature indicated by the information Tmb is equal to or greater than the threshold value Tth. According to this configuration, when the temperature rise does not occur in the electro-optical device 10, the occurrence of the black floating is suppressed, and when the temperature rise occurs, the power consumption is reduced, and the temperature rise is suppressed.

The temperature sensor 90 is not limited to a configuration in which the temperature sensor 90 is built in the electro-optical device 10, and may be separate from the electro-optical device 10.

In the embodiments, the OLED 130 has been described as an example of the light-emitting element, but other light-emitting elements may be used. For example, an LED may be used as the light-emitting element, or a liquid crystal element combined with an illumination mechanism may be used. That is, the light-emitting element is an electro-optical element which enters an optical state according to the voltage of the data line 14.

In the embodiments, a 10-bit conversion example is described as the DA conversion circuit 500, but the present disclosure is not limited thereto.

The channel type of the transistors 64, 82, 84, 86, 121 to 124, and the like is not limited to the embodiments. In addition, the channel of these transistors and the like may be appropriately changed, or may be appropriately replaced with a transmission gate.

In addition, in the embodiments, the head mounted display system 1 including the electro-optical device 10 is exemplified as an example of the electronic apparatus, but the disclosure is not limited thereto, and can be applied to an electronic viewfinder in a video camera, a lens interchangeable digital camera, and the like, a personal digital assistant, a display unit of a wristwatch, a light valve of a projection type projector, and the like.

For example, the following aspects of the present disclosure are understood from the embodiments illustrated above.

An electro-optical device according to one aspect (aspect 1) includes an optical sensor configured to detect brightness of ambient light or a temperature sensor configured to detect a temperature, a pixel circuit provided corresponding to a data line and a scanning line, and a control circuit configured to control the pixel circuit, in which the pixel circuit includes a light-emitting element configured emit light at brightness corresponding to a current flowing between two electrodes, and a drive transistor configured to supply, to the light-emitting element, a current corresponding to a voltage between a potential of a gate node and a potential of a source node, in a writing period, the control circuit supplies, to the gate node via the data line, a potential corresponding to a gradation level, and in a first initialization period before the writing period, the control circuit executes a first operation or a second operation in accordance with a detection result of the optical sensor or a detection result of the temperature sensor, the first operation being an operation of supplying, via the data line, a predetermined potential to one electrode of the light-emitting element, the second operation being an operation of distributing, to the one electrode, an electric charge accumulated in the data line.

According to the aspect 1, in the first initialization period, the first operation or the second operation is executed in accordance with the environment of the brightness or the temperature. In the first operation, it is possible to suppress visual recognition of black floating, and in the second operation, it is possible to suppress power consumption.

The LED 130 is an example of the light-emitting element, the pixel electrode 131 is an example of one of two electrodes, the transistor 121 is an example of the drive transistor, and the initialization period (A2) is an example of the first initialization period.

An electro-optical device according to a specific aspect 2 of the aspect 1 includes both the optical sensor and the temperature sensor, in which in the first initialization period, the control circuit executes the first operation or the second operation in accordance with the detection result of the optical sensor and the detection result of the temperature sensor. According to the aspect 2, the first operation or the second operation is executed in accordance with both environments of the brightness and the temperature.

In the electro-optical device according to another specific aspect 3 of the aspect 1, when the first operation is executed in the first initialization period, in a second initialization period before the first initialization period, the control circuit supplies, to the gate node via the data line, an off-potential configured to turn off the drive transistor, and when the second operation is executed in the first initialization period, in the second initialization period, the control circuit distributes, to the gate node via the data line, the electric charge accumulated in the parasitic capacitance of the data line.

According to the aspect 3, when the first operation is executed in the second initialization period, it is possible to reliably set the drive transistor to the off-state; and when the second operation is executed in the second initialization period, it is possible to suppress charge and discharge due to the parasitic capacitance of the data line.

The initialization period (A1) is an example of the second initialization period, and the potential Vel is an example of the off-potential.

The electro-optical device according to a specific aspect 4 of the aspect 3 includes a switching element including one end and another end, the one end being electrically coupled to the data line, the other end being electrically coupled to a power supply line configured to supply an on-potential, in which in a third initialization period after the first initialization period and before the writing period, the control circuit controls the switching element into an on-state, and the on-potential is a potential that turns on the drive transistor when the on-potential is supplied to the gate node.

According to the aspect 4, in the third initialization period, the potential of the data line becomes the on-potential by the setting the switching element to the on-state.

The initialization period (A3) is an example of the third initialization period, the transistor 82 is an example of the switching element, and the potential Vini is an example of the on-potential.

In the electro-optical device according to a specific aspect 5 of the aspect 4, in a compensation period after the third initialization period and before the writing period, the control circuit converges the potential of the gate node of the drive transistor to a potential corresponding to a threshold value of the drive transistor.

According to the aspect 5, since the data line has the on-potential in the third initialization period before the compensation period, it is easy to converge the potential of the gate node to the potential corresponding to the threshold value of the drive transistor in the compensation period.

In the electro-optical device according to another specific aspect 6 of the aspect 1, in the writing period, the control circuit supplies, to the gate node via a coupling capacitance and the data line, a potential corresponding to the gradation level.

According to the aspect 6, it is possible to suppress not only the parasitic capacitance of the data line but also the discharge amount of the coupling capacitance. Note that the capacitance element 70 is an example of the coupling capacitance.

An electronic apparatus according to an aspect 7 includes the electro-optical device according to any one of the aspects 1 to 6.

What is claimed is:

1. An electro-optical device comprising:

at least one of an optical sensor configured to detect a brightness of ambient light and a temperature sensor configured to detect a temperature;

a pixel circuit provided corresponding to a data line and a scanning line; and a control circuit configured to control the pixel circuit, wherein the pixel circuit includes a light-emitting element configured to emit light at a brightness corresponding to a current flowing between two electrodes of the light-emitting element, and a drive transistor configured to supply, to the light-emitting element, a current corresponding to a voltage between a potential of a gate node of the drive transistor and a potential of a source node of the drive transistor, in a writing period, the control circuit supplies, to the gate node via the data line, a potential corresponding to a gradation level, and in a first initialization period before the writing period, the control circuit executes a first operation or a second operation in accordance with a detection result of the optical sensor or a detection result of the temperature sensor, the first operation being an operation of supplying, via the data line, a predetermined potential to one electrode of the light-emitting element, the second operation being an operation of distributing, to the one electrode, an electric charge accumulated in the data line.

2. The electro-optical device according to claim 1, wherein the electro-optical device includes both the optical sensor and the temperature sensor, and in the first initialization period, the control circuit executes the first operation or the second operation in accordance with the detection result of the optical sensor and the detection result of the temperature sensor.

3. The electro-optical device according to claim 1, wherein when the first operation is executed in the first initialization period, in a second initialization period before the first initialization period, the control circuit supplies, to the gate node via the data line, an off-potential configured to turn off the drive transistor and when the second operation is executed in the first initialization period, in the second initialization period, the control circuit distributes, to the gate node, the electric charge of the data line.

4. The electro-optical device according to claim 3, further comprising:

a switching element including one end and another end, the one end being electrically coupled to the data line, the other end being electrically coupled to a power supply line configured to supply an on-potential, wherein in a third initialization period after the first initialization period and before the writing period, the control circuit controls the switching element into an on-state and the on-potential is a potential configured to turn on the drive transistor when the on-potential is supplied to the gate node.

5. The electro-optical device according to claim 4, wherein in a compensation period after the third initialization period and before the writing period, the control circuit converges the potential of the gate node of the drive transistor to a potential corresponding to a threshold value of the drive transistor.

6. The electro-optical device according to claim 1, wherein in the writing period, the control unit supplies, to the gate node via a coupling capacitance and the data line, a potential corresponding to the gradation level.

7. An electronic apparatus comprising the electro-optical device according to claim 1.

* * * * *